(12) United States Patent
Knopp

(10) Patent No.: US 10,766,704 B2
(45) Date of Patent: Sep. 8, 2020

(54) TRANSPORT SYSTEM, METHOD OF MANUFACTURING THE TRANSPORT SYSTEM

(71) Applicant: WALLROTH F & E UG (HAFTUNGSBESCHRÄNKT), Arzbach (DE)

(72) Inventor: Hans Werner Knopp, Großholbach (DE)

(73) Assignee: WALLROTH F & E UG (HAFTUNGSBESCHRÄNKT), Arzbach (DE)

( * ) Notice: Subject to any disclaimer, the term of this patent is extended or adjusted under 35 U.S.C. 154(b) by 0 days.

(21) Appl. No.: 16/561,085

(22) Filed: Sep. 5, 2019

(65) Prior Publication Data

US 2020/0087072 A1 Mar. 19, 2020

(30) Foreign Application Priority Data

Sep. 13, 2018 (DE) .......................... 10 2018 122 451

(51) Int. Cl.
*B65G 15/46* (2006.01)
*B65G 39/071* (2006.01)
(Continued)

(52) U.S. Cl.
CPC ............. *B65G 15/46* (2013.01); *B29D 29/06* (2013.01); *B65G 15/42* (2013.01); *B65G 15/64* (2013.01);
(Continued)

(58) Field of Classification Search
CPC ........ B65G 15/42; B65G 15/46; B65G 15/64; B65G 23/06; B65G 39/071;
(Continued)

(56) References Cited

U.S. PATENT DOCUMENTS 207,626 A 9/1878 Sargent
3,368,663 A * 2/1968 Kufferath ............... B65G 15/48
198/840

(Continued)

FOREIGN PATENT DOCUMENTS

CN 207107729 U 3/2018
DE 2928403 A1 1/1980
(Continued)

*Primary Examiner* — Gene O Crawford
*Assistant Examiner* — Keith R Campbell
(74) *Attorney, Agent, or Firm* — Schmeiser, Olsen & Watts, LLP

(57) ABSTRACT

A transport system for conveying goods in a conveying direction along a conveyor belt plane of a conveyor belt is provided. On a bearing, oriented along the conveyor belt plane, for bearing the goods and, on a guiding side of the conveyor belt, at least one guide surface, oriented along the conveyor belt plane, for guiding the conveyor belt. The conveyor belt includes a plurality of notches in the guide surface. The notches include a plurality of guide notches to engage at least one guide ridge for guiding the conveyor belt along the conveying direction, wherein a longitudinal axis of each of the guide notches is oriented along the conveying direction, and a number of drive notches for engaging at least one drive ridge for driving the conveyor belt along the conveying direction.

13 Claims, 10 Drawing Sheets

(51) Int. Cl.
   *B65G 23/06* (2006.01)
   *B65G 15/64* (2006.01)
   *B65G 15/42* (2006.01)
   *B29D 29/06* (2006.01)

(52) U.S. Cl.
   CPC ............ *B65G 23/06* (2013.01); *B65G 39/071* (2013.01); *B65G 2812/02168* (2013.01); *B65G 2812/02217* (2013.01)

(58) Field of Classification Search
   CPC ............ B65G 2812/02148; B65G 2812/02168; B65G 2812/02217; B29D 29/06
   See application file for complete search history.

(56) References Cited

U.S. PATENT DOCUMENTS

| | | | |
|---|---|---|---|
| 3,941,238 A | 3/1976 | Lapeyre | |
| 4,011,939 A * | 3/1977 | Conrad | B65G 15/46 198/840 |
| 4,449,958 A * | 5/1984 | Conrad | B65G 15/42 198/834 |
| 5,037,360 A | 8/1991 | Fujiwara et al. | |
| 5,723,202 A | 3/1998 | Mueller et al. | |
| 5,911,307 A * | 6/1999 | Kraft | B65G 15/64 198/846 |
| 6,910,571 B1 * | 6/2005 | Ertel | B65G 21/105 193/35 R |
| 7,681,717 B2 * | 3/2010 | DeGroot | B65G 15/30 198/832 |
| 8,192,316 B2 * | 6/2012 | Marc | B65G 15/34 442/229 |
| 8,403,130 B1 | 3/2013 | Mitchell | |
| 8,905,227 B2 * | 12/2014 | Pertuit, Jr. | B65G 15/64 198/844.1 |
| 10,053,294 B2 | 8/2018 | DeGroot | |
| 10,273,088 B2 * | 4/2019 | Bannerman | B65G 15/62 |
| 2008/0041494 A1 * | 2/2008 | Paavola | B27B 25/04 144/242.1 |

FOREIGN PATENT DOCUMENTS

| | | | |
|---|---|---|---|
| DE | 69020831 T2 | 12/1995 | |
| DE | 202012103271 U1 | 12/2012 | |
| DE | 202012103271 U1 * | 12/2012 | ........... B65G 39/071 |
| DE | 102012012858 A1 | 1/2014 | |
| DE | 102013205997 A1 | 10/2014 | |
| EP | 0679522 A2 | 11/1995 | |
| EP | 2343252 A1 | 7/2011 | |
| GB | 1039312 A | 8/1966 | |

\* cited by examiner

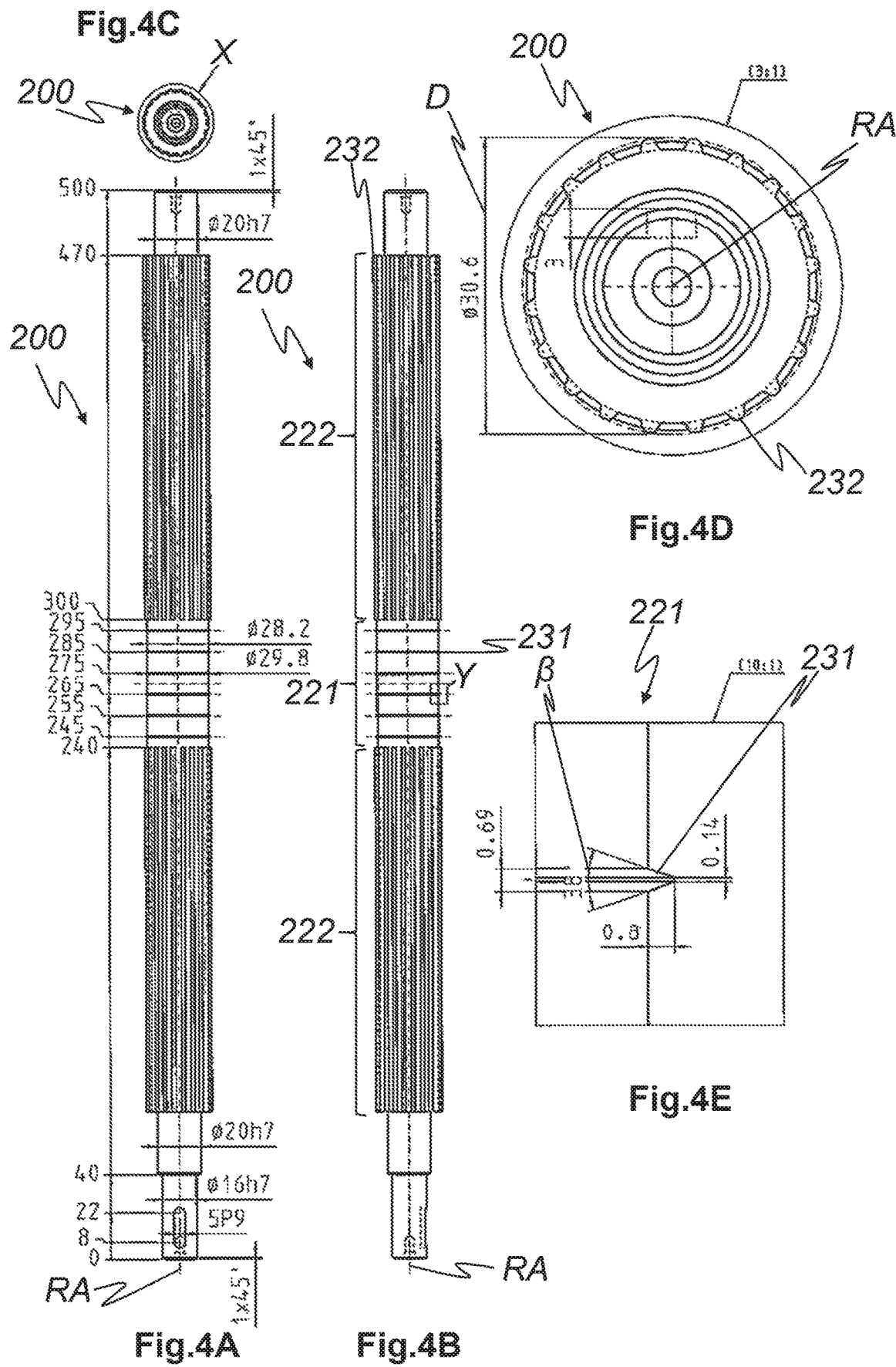

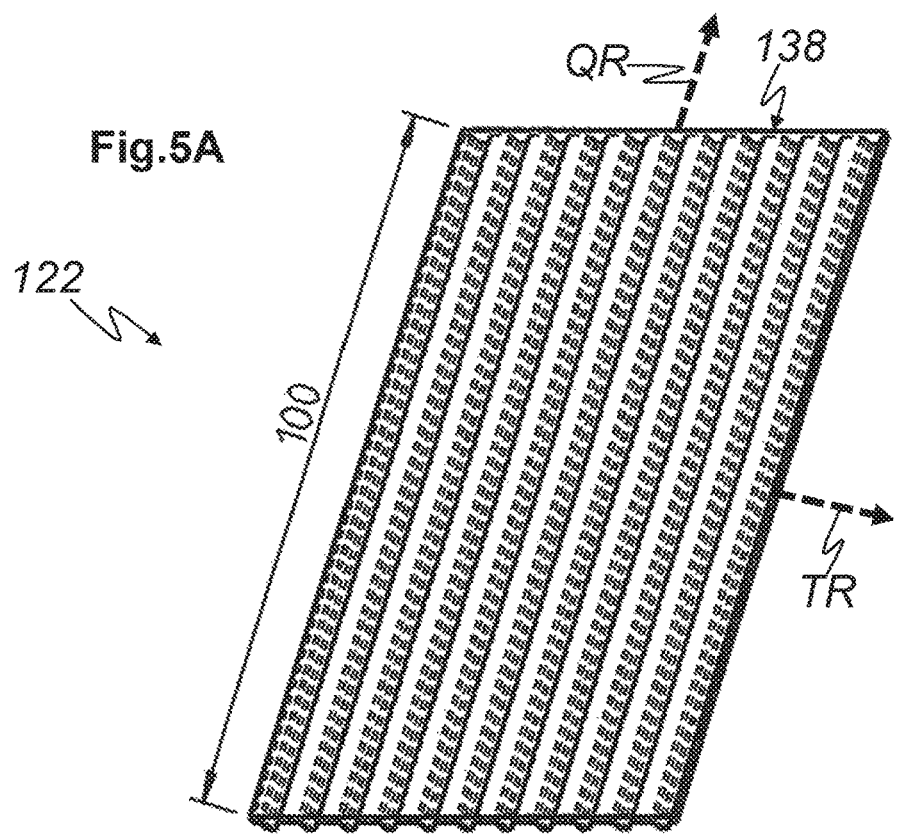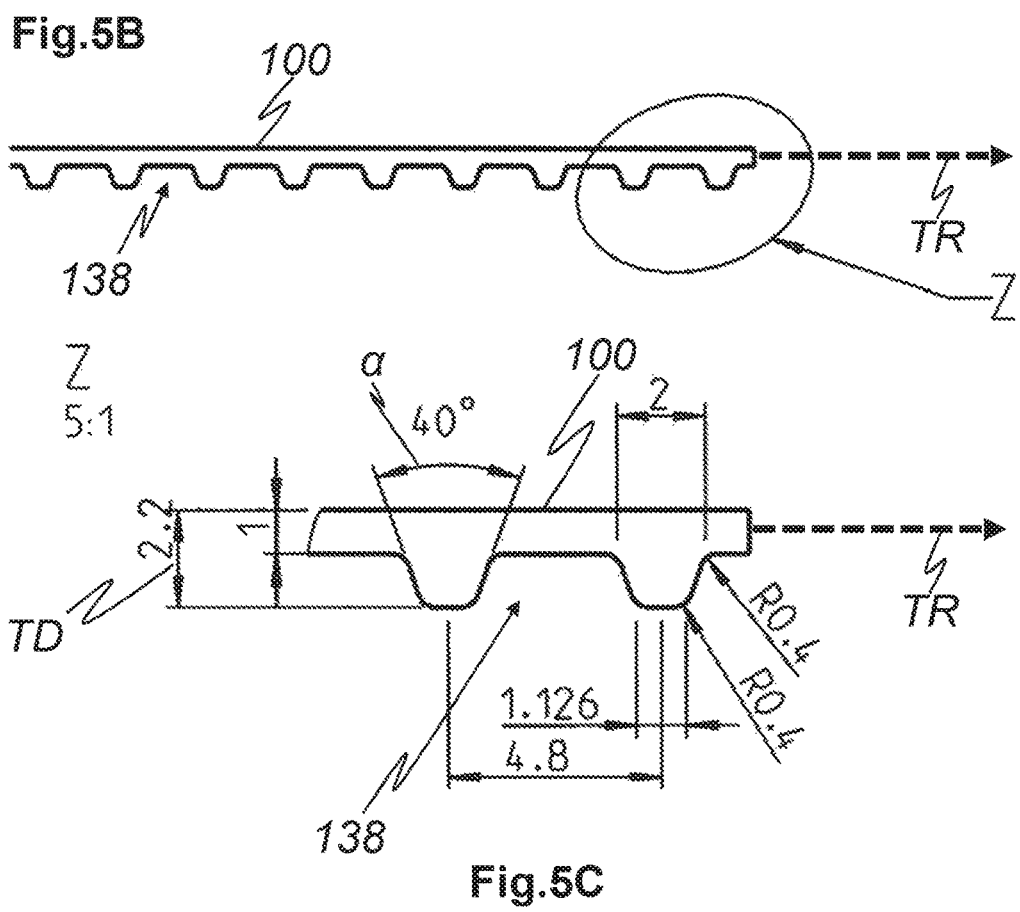

TRANSPORT SYSTEM, METHOD OF MANUFACTURING THE TRANSPORT SYSTEM

CROSS-REFERENCE TO RELATED APPLICATIONS

This application claims priority to DE 10 2018 122 451.6, having a filing date of Sep. 13, 2018, the entire contents of which are hereby incorporated by reference.

FIELD OF TECHNOLOGY

The following relates to a transport system for conveying goods in a conveying direction along a conveyor belt plane of a conveyor belt.

The following furthermore relates to a method for manufacturing a transport system according to embodiments of the invention.

BACKGROUND

Many types of resilient conveyor belts are known, wherein the conveyor belts are generally configured so as to be continuous and are thusly arranged on a frame in a circulatory manner. Here, the conveyor belts are guided and deflected on rollers of deflection and/or drive devices mounted in the frame, and are, if necessary, driven by means of these rollers.

In order that a conveyor belt can be guided in a defined manner on a roller, in particular transversely to the conveying direction of the belt, such rollers are often shaped spherically, resulting in the effect of the conveyor belt being retained and guided substantially centrally on this spherical region during operation. Disadvantageous in spherically configured rollers of this kind is that dirt may accumulate along the lateral regions of the conveyor belt, between the conveyor belt and the spherical roller, which dirt may interfere with the guiding effect, so that a required lateral guiding of the conveyor belt can no longer be adequately ensured, whereby, in the worst case, the conveyor belt can run down laterally off the spherical roller and spring off.

CN207107729U, for example, describes a bulbous drive roller with ridges for a conveyor belt that are oriented transversely to the conveying direction, wherein the ridges prevent a sticking the conveyor belt to the drive roller, with a thusly associated lateral deflection of the conveyor belt. Through the combination of the ridges with the bulbous shape of the drive roller the lateral slipping off of the drive roller from the conveyor belt is prevented.

With respect to another structural solution, it is known to provide rollers set slightly towards one another, in order to be able to support a conveyor belt on both sides, at the edge regions thereof, viewed in the conveying direction, so that a lateral migration of the conveyor belt transversely to the conveying direction can be prevented. However, this solution is quite laborious owing to the large number of rollers required.

In view of a particularly simple configuration of a transport system including a conveyor belt, the conveyor belt may, for example, form merely an upper run and a lower run which are guided substantially in parallel with one another.

GB1039312A discloses a conveyor system with a continuous belt. This belt comprises elevations extending in the longitudinal direction. The subject matter of GB1039312A further comprises a roller for guiding the continuous belt, which roller comprises parallel grooves in the circumferential direction that can engage in the grooves of the belt. Substantially U-shaped grooves are described as a particular form.

A disadvantage here is that belts of this kind comprise no optimal grip on the rollers, and friction losses can occur for this reason. In addition, in a temperature shift, the accuracy of fit between grooves in the belt and elevations on the rollers can suffer. It is important for a particularly accurate fit to be achieved in the assembly and the manufacture.

EP679522A1 describes a conveyor belt element for conveying goods, with a resiliently bendable and planarly configured main body with a receiving surface for receiving the goods and with a track guide device for guiding the conveyor belt element on a support means. The track guide means includes one or multiple groove elements configured as a material weakening in each case and arranged in the resiliently bendable main body extending in the direction of travel of the conveyor belt element.

The above-mentioned conveyor belts are generally driven through a force-fitting force transmission, by drive rollers that are in contact with the conveyor belts. If heavy goods are to be transported, or if a movement of the conveyor belt is impeded by high friction losses, for example at deflection or guide elements, slip may occur between the drive rollers and the conveyor belt, which slip leads to increased wear and an unreliable driving of the conveyor belt. This problem arises in particular in the case of conveyor belts that are guided by guide elements that engage in grooves, as particularly high friction losses occur here.

U.S. Pat. No. 3,980,174A describes a resilient conveyor belt with longitudinal grooves, between which respectively ridges with an M-shaped cross section are arranged. The ridges can engage in complementarily shaped notches of a drive roller, wherein the ridges are splayed, which can lead to an improved frictional connection to the drive of the conveyor belt. However, owing to the complex geometry, a jamming of the conveyor belt can easily occur, and the manufacture of the conveyor belt and the drive roller are complex.

SUMMARY

An aspect relates to a cost-effective transport system, wherein a resilient conveyor belt is driven and guided in a reliable and low-wear manner. A further problem addressed by embodiments of the invention is that of providing an as simple as possible manufacturing method therefor.

A resilient conveyor belt according to embodiments of the invention is configured for a transport system for conveying goods in a conveying direction along a conveyor belt plane of the conveyor belt. Under the intended operating conditions thereof, a "conveyor belt" within the meaning of embodiments of the invention is a resilient, planar, for example substantially cuboid, body, the extension of which is substantially greater in the conveyor belt plane than perpendicularly thereto. A conveyor belt of this kind has two planar sides, one of which is generally used for carrying the goods, and in each case two substantially smaller narrow sides along the conveying direction and end faces transversely to the conveying direction.

The end faces are generally interconnected, for example welded together, such that the conveyor belt is "continuous". A conveyor belt is generally elongate, wherein, in the conveying plane, an extension along the conveying direction is substantially greater than an extension in a transverse direction transversely thereto. In particular if the conveyor belt is used in a transport system it may be curved, with the result that different regions of the conveyor belt can have conveying planes and conveying directions that are different from one another.

Within the meaning of embodiments of the invention, the term "along" is used synonymously with "substantially in parallel with", i.e. for example at an angle of from 0° to 10°, in particular from 0° to 5°, from 0° to 2°, inclusive. Within the meaning of embodiments of the invention, the term "transverse(ly)" is used synonymously with "substantially perpendicular(ly)", i.e. for example at an angle of from 80° to 90°, in particular 85° to 90°, 88° to 90°, inclusive.

On a bearing side of the conveyor belt the conveyor belt comprises at least one bearing surface for carrying the goods, which surface is oriented along the conveyor belt plane. The bearing side is a planar side of the conveyor belt. In the simplest case, the bearing surface is configured such that the goods can be placed thereon. In particular, the entire bearing side may form the bearing surface, in order to provide as large as possible a surface area for carrying the goods.

On a guiding side of the conveyor belt the conveyor belt comprises at least one guide surface for guiding the conveyor belt, which surface is oriented along the conveyor belt plane. The guiding side is a planar side of the conveyor belt, in particular the planar side of the conveyor belt that is opposite the bearing side.

The spatial separation of the bearing surface and guide surface makes it possible for the two surfaces to be optimized for different requirements. For example, the bearing surface may be configured so as to be smooth, for easy cleaning, while the guide surface comprises drive and guide notches. In particular, the entire guiding side may form the guide surface, in order to provide as large as possible a surface area for guidance that is as precise and reliable as possible.

The guide surface comprises a plurality of notches. The notches comprise a plurality of, for example 2 to 20, in particular 5 to 15, guide notches for engagement of at least one guide ridge for guiding the conveyor belt along the conveying direction, wherein a longitudinal axis of each of the guide notches is oriented along the conveying direction.

At least one of the guide notches, in particular each guide notch, extends over the entire length of the guide surface, along the conveying direction, in order to ensure guidance that is as reliable as possible, and to prevent possible increased friction and/or increased wear of the guide ridge and/or of the conveyor belt at an end of the guide notch.

At a specified notch depth, a plurality of, i.e. two, three, four or more, guide notches make it possible to achieve a larger overall contact surface for contact with the guide ridges, and thus more reliable guidance, than in the case of a single notch. At the same time, a specified guiding strength can be achieved at a smaller notch depth. As a result, the conveyor belt can be configured so as to be thinner, and thus more material-saving and more flexible. A more flexible conveyor belt is advantageous in that it can be used in a particularly space-saving transport system having smaller curve radii or smaller deflection rollers or drive rollers.

A further advantage of guiding the transport belt instead of on just one, on a plurality of guide notches that are in particular in parallel with one another and mutually spaced in the transverse direction, is that shearing in the conveyor belt plane is less pronounced in the event of non-uniform stress or lateral tension. This increases the conveying reliability and leads to lower material wear. Shearing is particularly disadvantageous in the case of conveyor belts that are driven by means of drive notches having corresponding drive ridges, which conveyor belts tend to jam in the event of shearing. According to embodiments of the invention, it is important for the conveyor belt material to be resilient, in order that the absorbed shear forces can be resiliently absorbed and dissipated again, without damaging or deflecting the conveyor belt.

Furthermore, a guiding strength can be adjusted to the requirements of a transport system in a particularly simple manner, by means of selecting a suitable number of notches. This adjustment is in particular simpler than adjusting the notch depth, which, owing to the limited thickness of the conveyor belt, is possible only within narrow limits without endangering the mechanical stability of the conveyor belt.

Furthermore, a plurality of guide notches at different regions of a transport system makes it possible for the conveyor belt to be guided at different strengths, by means of a larger or smaller number of guide ridges engaging in the guide notches. It is thus possible, for example, for guidance by means of just a few guide ridges to take place in straight or slightly curved portions of the transport system, in order to minimize friction losses, while particularly reliable guidance using a plurality of guide ridges takes place in significantly curved portions.

The notches comprise a number of drive notches for engagement of at least one drive ridge for driving the conveyor belt along the conveying direction, wherein a longitudinal axis of each of the drive notches is oriented in a transverse direction transversely to the conveying direction.

At least one of the drive notches, in particular each drive notch, extends over the entire width of the guide surface, in the transverse direction, in order to ensure drive that is as reliable as possible.

For the purpose of interlocking rather than frictional driving of the conveyor belt in the conveying direction, the drive ridges can engage in a number of guide notches that is sufficient for reliable driving, such that no slip can occur between the conveyor belt and a drive roller, and the driving takes place in a particularly efficient, reliable and low-wear manner, even if a larger number of guide notches and drive notches bring about increasing mechanical material weakening of the conveyor belt. The interlocking contact allows for reliable driving in particular even in the case of dirt, for example oil, grease or flour.

Furthermore, the conveyor belt can be guided around a drive roller at a lower preload, for example at an elongation of the conveyor belt by 0.1% to 2%, than in the case of frictional driving, as a result of which the mechanical stress for the conveyor belt and for the bearings of the drive roller, as well as the associated wear, are reduced. Therefore, a conveyor belt according to embodiments of the invention can be configured so as to be sufficiently reliable and stable, at greater mechanical weakening and having a larger number of notches compared with the prior art.

The combination of guide notches and drive notches has the particular advantage that reliable guidance and reliable driving are achieved using particularly simple means. In particular, both the guidance and the drive can be ensured by a simply configured drive roller which can be configured for example according to embodiments of the present invention. Furthermore, the guidance and drive can be ensured without the need to interfere with the bearing surface of the conveyor belt, with the result that the surface can be used entirely for goods conveying and can be easily cleaned.

A further advantage of combining a plurality of guide notches with drive notches is that the conveyor belt is subject to less shearing from the guide notches, with the result that the guide notches cannot jam with associated drive ridges.

The guide surface may comprise two edge regions and a central region that is arranged between the edge regions, in the transverse direction, wherein the guide notches are arranged in the central region and the drive notches are arranged in the edge regions and also in the central region, wherein no guide notches are arranged in the edge regions.

Arranging the guide notches in the central region is advantageous in that there is less risk, here, of a guide ridge jamming in a guide notch, in the event of shearing of the conveyor belt in the conveyor belt plane, for example in a curve, than is the case when the guide notches are arranged in an edge region. This effect is more pronounced, the larger the number of guide notches.

Arranging the drive notches in the edge regions is advantageous in that the driving take place more reliably, in particular without shearing of the conveyor belt in the conveyor belt plane, than is the case when the drive notches are arranged only in the central region. This applies in particular in the case of a large width of the conveyor belt in the transverse direction, for example of 70 cm. For particularly simple manufacturing, the drive notches may be arranged both in the edge regions and in the central region, in particular over an entire width of the conveyor belt, in the transverse direction.

For example, when both the guide notches and the drive notches are arranged in the central region, the guide notches may intersect with the drive notches.

The conveyor belt is advantageously resiliently bendable at a radius of curvature, perpendicularly to the conveying plane, of 15 mm, 10 mm, particularly 6.5 mm. The flexibility can be adjusted by means of the conveyor belt thickness perpendicularly to the conveyor belt plane and/or by means of the resiliency of a conveyor belt material. Furthermore, the flexibility is increased by the drive notches.

A high degree of flexibility, i.e. a smaller radius of curvature, is advantageous in that the conveyor belt can be guided around small deflection drums and drive drums, resulting in a particularly space-saving design of a transport system.

A conveyor belt thickness of the conveyor belt perpendicularly to the conveying plane is from 1 mm to 5 mm, in particular from 2 mm to 3 mm. A plurality of guide notches and drive notches makes it possible to achieve reliable guidance and reliable driving, even at a small conveyor belt thickness, i.e. also a small notch depth. The advantages of a thin conveyor belt are low material costs for manufacturing, a low mass, and high flexibility perpendicularly to the conveyor belt.

The conveyor belt advantageously has a hardness of from 50 to 100 Shore A, in particular from 65 to 95 Shore A. This hardness range has been found to be particularly advantageous in practical applications, in order to minimize the wear both of the conveyor belt and of components of a transport system that come into contact with the conveyor belt, for example a drive roller.

The conveyor belt may comprise at least one guide layer that contains the notches, at least one bearing layer that forms the bearing surface, and at least one reinforcement layer for mechanical reinforcement of the conveyor belt. A multi-layer structure makes it possible to optimize the material properties of the individual layers for different requirements.

Thus, for example, the guide layer may consist of a material into which the notches can be made easily and/or that has a low coefficient of friction and/or low wear with respect to the guide ridges and/or drive ridges. Furthermore, the guide layer may consist of a material that can easily undergo resilient deformation, such that forces exerted on the guide layer by the guide ridges and/or drive ridges can be absorbed by the guide layer without damaging the guide layer, the guide ridges and/or the drive ridges.

The bearing layer may for example consist of a material that can be cleaned and/or disinfected easily, and/or that allows for a high loading capacity of the conveyor belt.

For example, a reinforcement layer may be arranged between the guide layer and the bearing layer, which reinforcement layer may for example consist of a material having a high degree of stiffness and/or strength, in order to ensure a high loading capacity and to prevent plastic deformations of the conveyor belt which may render the belt unusable.

The layers are arranged along the conveying plane and/or are rigidly, in particular integrally, interconnected, for example adhesively bonded and/or welded together.

In order to achieve particularly simple manufacture, a base surface of a notch may be formed by an interface between the guide layer and the reinforcement layer or the bearing layer that is exposed in the region of the notch. In this case, the conveyor belt can be manufactured for example by forming the at least one notch as a through-slot in the guide layer before or after the guide layer is bonded to the reinforcement layer or the bearing layer.

The conveyor belt may comprise or consist of a plastics material that is resilient at least under the intended operating conditions of the conveyor belt, for example a polyurethane, a reinforced, particularly fiber-reinforced, plastics material. In particular, the layers of the conveyor belt may comprise or consist of different plastics materials. For example, the reinforcement layer may comprise a fiber-reinforced plastics material.

It is particularly preferable for the conveyor belt to have a homogeneous material composition, i.e. not to comprise any layers of different materials. As a result, possible bonding problems at interfaces between different materials are excluded, and the conveyor belt can be manufactured in a particularly simple manner. The conveyor belt may for example consist, in a monolithic manner, of precisely one plastics material in particular one polyurethane.

The guide layer of the conveyor belt may comprise a material that is compressed relative to the other layer(s) of the conveyor belt, for example by means of heat treatment and/or pressure treatment. This increases a thermal and/or mechanical resistance of the guide layer, with the result that the guide surface, in particular a surface structure of the guide surface, is not damaged when forming a notch and/or when smoothing the base surface, the left flank surface and/or the right flank surface of a notch.

The bearing surface is configured without notches, in particular so as to be smooth or microstructured, for example having rounded structure edges. As a result, the bearing surface is easy to clean, and therefore the conveyor belt can also be used in hygienically sensitive fields, for example in food production.

The notches can be configured for example having a V-shaped, U-shaped, rectangular or semi-circular cross section, transversely to the longitudinal axis thereof. A V-shaped, U-shaped or semi-circular cross section is advantageous in that a ridge can be formed therein in a particularly simple manner, without jamming. In particular, when the ridge is formed, automatic centering between the notch and ridge results.

At least one notch comprises at least one base surface for limiting a penetration depth of the ridge, engaging in the notch, into the conveyor belt. The base surface provides a defined stop for the ridge, in particular for a ridge having an end of any desired shape, with the result that the conveyor belt is guided precisely and reliably at a defined spacing from the ridge.

Furthermore, an increased contact surface between the ridge and the notch results, for example compared with a V-shape, such that local mechanical stress of the ridge and conveyor belt is reduced. It is thus possible, for example, to use a less wear-resistant material for the ridge or the conveyor belt. The material can thus be selected for example for reasons of reducing costs or weight.

Moreover, it is less likely, in the case of a notch having a base surface, for example compared with a V-shaped notch, that foreign bodies settle in the notch or that the ridge jams in the notch, both of which would increase the wear.

Furthermore, a notch comprising a base surface is less deep than a V-shaped notch, at the same opening width and the same flank angle. The conveyor belt is thus subjected to less mechanical weakening by a notch comprising a base surface and has an increased service life and/or mechanical resilience.

The at least one notch comprises at least one left flank surface for left lateral guidance of the ridge, which flank is arranged so as to be oblique to the conveyor belt plane and connects the guide surface to the base surface, and/or at least one right flank surface for right lateral guidance of the ridge, which flank is arranged so as to be oblique to the conveyor belt plane and connects the guide surface to the base surface. In this case, the base width of the base surface perpendicularly to the longitudinal direction of the notch is smaller than an opening width of the notch perpendicularly to the longitudinal direction and in a plane with the guide surface. The notch thus widens from the base surface to the guide surface.

For practical applications, the opening width may for example advantageously be 110% to 200%, in particular 130% to 180%, of the base width, wherein the base width may be for example 2 mm to 8 mm, in particular 3 mm to 4 mm.

The left flank surface and the right flank surface are arranged so as to be symmetrical to a center plane of the notch that contains the longitudinal axis of the notch and is oriented so as to be perpendicular to the guide surface, with the result that a ridge undergoes uniform left and right lateral guidance in the notch. Furthermore, a notch having symmetrical flank surface is particularly simple to manufacture, and it is not necessary to pay attention to correct orientation of a right and left side of the notch when mounting a corresponding conveyor belt.

A notch that widens towards the guide surface results in the notch, and thus the conveyor belt, being automatically aligned with the ridge when the ridge engages laterally to the longitudinal direction of the notch. That is to say that the ridge can engage in the notch for reliable guidance of the conveyor belt even in the case of deviations of the width or lateral position of the ridge from the width or lateral position of the base surface of the notch, for example as a result of elongation or buckling of the conveyor belt owing to manufacturing tolerances or wear.

A notch that widens in the direction of the guide surface is furthermore advantageous in that a gap can remain between the ridge and the conveyor belt, laterally to the longitudinal direction of the notch, with the result that the ridge is not wedged in the notch, even in the event of lateral buckling of the conveyor belt.

The roughness of the base surface, the left flank surface and/or the right flank surface, in particular each of the surfaces, is less than that of the guide surface. The term "roughness" denotes in particular a geometrical deviation of the third to fifth order in technical surfaces, according to the Standard DIN 4760. The roughness can be expressed for example as the mean roughness $R_a$, which corresponds to the root mean square of the deviation of the measuring points on the surface from the center line of the surface, or as the quadratic roughness $R_q$, which corresponds to the root mean square of the deviation of the measuring points from the center line, or as the surface roughness value $S_a$ according to the Standard EN ISO 25178.

A guide surface of a conventional conveyor belt typically has a structured surface, and thus a high degree of roughness, in order to prevent the guide surface from sticking to a deflection roller or a drive roller of the transport system. However, in particular in the at least one notch, a structured surface can promote deposition of foreign bodies and colonization of microorganisms and make hygienic cleaning of the conveyor belt more difficult, which is problematic in particular in the event of use of the conveyor belt in food processing.

A roughness in the at least one notch that is reduced compared with the guide surface therefore results in an improvement in keeping the conveyor belt clean, and easier hygienic cleaning of the conveyor belt. Tests have shown that it is particularly advantageous, for typical conveyor belts, for the roughness of the base surface, the left flank surface and/or the right flank surface to be for example 0.5% to 50%, in particular 1% to 10%, of the corresponding roughness of the guide surface.

The base surface is oriented along the conveyor belt plane. As a result, the penetration depth of the ridge into the notch is the same over the entire base surface, allowing for particularly reliable guidance.

The left flank surface can transition into the base surface in a left transition region, and the right flank surface can transition into the base surface in a right transition region, wherein the left transition region and/or the right transition region can be formed as an edge. An edge is advantageous in that, in contrast with a rounded transition, it inhibits a lateral movement of the ridge out of the notch, along the conveying plane perpendicularly to the longitudinal direction of the notch. This achieves particularly reliable guidance, in particular in the case of lateral stress, for example when the conveyor belt is guided around a curve.

When the flank surfaces each transition into the base surface at an edge, the base surface and the flank surfaces can for example be manufactured so as to be flat, and thus in a simple and cost-effective manner. If the base surface and edge surfaces are flat, a notch having a trapezoidal cross-sectional area perpendicularly to the longitudinal direction of the notch results.

The base surface, the left flank surface and/or the right flank surface, in particular at least the two flank surfaces, are flat, i.e. not curved, and therefore they can be manufactured in a simple and cost-effective manner, in particular by means of subtractive processes, for example by means of milling. Furthermore, flat surfaces form particularly large contact surfaces for contact with conventional ridges having a rectangular cross section, improving the guidance and reducing the local material stress.

For example, for the purpose of adjustment to a rounded ridge, the base surface, the left flank surface and/or the right flank surface may be curved, concavely curved about the longitudinal axis, towards the notch. The at least one base surface is concavely curved about the longitudinal axis, towards the notch.

In a particularly advantageous embodiment, the flank surfaces are flat, and the base surface is concavely curved about the longitudinal axis, towards the notch. Such a shape of the notch can be manufactured in a particularly simple manner, for example by means of grinding or milling. Moreover, it is thus possible for the flank surfaces to transition into the base surface without edges, at which an accumulation of foreign bodies or increased material stress may occur.

According to an embodiment of the transition regions, it is furthermore proposed that the left transition region and the right transition region be formed so as to be rounded, i.e. without edges. Omitting edges in the at least one notch prevents possible accumulation of foreign bodies or increased material stress in the edge region.

In order to connect the base surface to the guide surface, the flank surfaces and/or the base surface must be curved in the case of the embodiment without edges in the notch. Only the base surface is curved, in order for it to be possible to manufacture the notch in a particularly simple manner.

It is alternatively also conceivable that only the flank surfaces are curved, and the base surface is flat, in order to allow for the above-mentioned advantages of a flat base surface. Flank surfaces that are concavely curved towards the longitudinal axis of the notch are furthermore advantageous in that a pitch of the flank surfaces increases from the base surface towards the guide surface. The pitch of the flank surfaces that increases towards the outside means that the guide force exerted on the conveyor belt by a guide ridge is greater, transversely to the conveying direction, the further the conveyor belt is deflected out of the intended position thereof, relative to the guide ridge. As a result, the low pitch in the vicinity of the base surface ensures low friction and low wear, provided that the conveyor belt runs at the intended position thereof. At the same time, the high pitch at the edge of the notch, close to the guide surface, ensures strong and reliable guidance when the conveyor belt threatens to break out of the intended position thereof.

In particular, in the embodiment without edges in the notch the flank surfaces and the base surface may be curved, such that for example a notch having a cross section in the shape of a circular sector, for example a semi-circle, perpendicularly to the longitudinal direction of the notch. A cross section in the shape of a circular sector offers the advantage of particularly uniform distribution of mechanical stresses, and thus particularly low wear.

The left flank surface encloses a flank angle with the right flank surface, wherein the flank angle is from 30° to 60°, from 35° to 55°, in particular 40°. On the one hand, a small flank angle, i.e. a high pitch of the flank surfaces from the base surface to the guide surface, allows for particularly reliable lateral guidance of the ridge in the notch and reduces the risk of the ridge being pushed out of the notch in the event of buckling of the conveyor belt.

On the other hand, the advantages described above of a notch that widens towards the guide surface come into effect in particular in the case of a large flank angle, i.e. a small pitch of the flank surfaces from the base surface to the guide surface. For practical applications, between these opposing requirements, a flank angle from 30° to 60°, from 35° to 55°, in particular 40°, has been found to be particularly advantageous.

A drive roller according to embodiments of the invention is configured for driving a resilient conveyor belt according to embodiments of the invention that is in contact with an outer surface of the drive roller, by means of rotation of the drive roller about an axis of rotation, wherein the outer surface comprises a plurality of ridges.

The drive roller is for example configured so as to be substantially cylindrical, having the axis of rotation as the central longitudinal axis.

The ridges comprise a number of drive ridges for engagement in the drive notches of the conveyor belt for driving the conveyor belt along the conveying direction, wherein a longitudinal axis of each of the drive ridges is oriented along the axis of rotation.

The ridges comprise a plurality of guide ridges for engagement in the guide notches of the conveyor belt for guiding the conveyor belt along the conveying direction, wherein each of the guide ridges extends around the axis of rotation in the circumferential direction of the drive roller.

The guide ridges and drive ridges make it possible for the drive roller to guide and drive the conveyor belt in an efficient and reliable manner.

The ridges may be of a shape that is complementary to the associated notches, in order to allow for contact over a particularly large surface area and high force transmission between the notches and ridges.

The ridges may for example have a rectangular, trapezoidal, V-shaped, U-shaped or semi-circular cross-sectional area perpendicularly to the longitudinal axis thereof.

The ridges may be configured so as to be continuous, or interrupted, for example in order to save material or to reduce friction.

The outer surface may comprise two edge regions and a central region that is arranged between the edge regions, along the axis of rotation, wherein the guide ridges are arranged, exclusively, in the central region, and the drive ridges are arranged, exclusively, in the edge regions.

The mentioned arrangement of the ridges in the edge regions and in the central region makes it possible for the ridges to interact in an advantageous manner with notches that are arranged correspondingly in the edge regions and in the central region of the guide surface of the conveyor belt.

A diameter of the drive roller measured perpendicularly to the axis of rotation is 15 mm to 45 mm, in particular 25 mm to 35 mm. A diameter in the mentioned value range simultaneously allows for reliable driving of the conveyor belt, since there is space for a sufficiently large number of drive ridges, and a compact design of a transport system.

In the case of a thin conveyor belt having a correspondingly small notch depth and ridge height, a sufficiently large number of drive ridges for reliable driving of the conveyor belt can also be arranged on a drive roller having a small diameter.

A transport system according to embodiments of the invention is configured for conveying goods in a conveying direction along a conveyor belt plane of a conveyor belt according to embodiments of the invention.

The transport system comprises at least one drive roller according to embodiments of the invention for driving the conveyor belt. The transport system may comprise further drive rollers which can likewise be configured according to embodiments of the invention.

In particular, the drive system may comprise a plurality, for example relative to the number of guide ridges and/or drive ridges, of drive rollers according to embodiments of the invention that are of different designs. The transport system may for example comprise at least one drive roller that comprises drive ridges but no guide ridges, and/or at least one guide roller that comprises guide ridges but no drive ridges.

As a result, different requirements placed on the drive and/or the guidance of the conveyor belt in different regions of the transport system can be met using a single conveyor belt. In particular, requirements that change over the service life of the transport system can also be met by means of exchanging drive rollers and/or guide rollers, without exchanging the conveyor belt.

The conveyor belt comprises a plurality of guide notches, for example 2 to 20 guide notches, in particular 5 to 15 guide notches, wherein the transport system comprises at least one guide ridge for each of the guide notches, which guide ridge engages in the relevant guide notch in order to guide the conveyor belt along the conveying direction. A plurality of guide notches makes it possible to achieve reliable lateral guidance of the conveyor belt at lower material stress and/or a lower notch depth than in the case of a single guide notch, with the result that the service life of the conveyor belt and of the guide ridges increases. However, in order to allow for low-friction interaction, without jamming, with the associated guide ridges, the guide notches must be exactly aligned with the guide ridges, and therefore the conveyor belt and the guide ridges have to be manufactured and arranged in the transport system in a precise manner. Furthermore, exact orientation in an assembly state can also be lost during operation of the transport system, if the conveyor belt is deformed for example owing to mechanical stress caused by the transported goods or by a drive of the conveyor belt.

At least one guide notch of the conveyor belt, and the guide ridge of the drive roller engaging therein, may be configured such that there is mechanical transverse play in the transverse direction between the guide notch and the guide ridge, when the conveyor belt is not subjected to transverse stress in the transverse direction. In particular, a plurality of, in particular all, the guide ridges and guide notches may be configured in this way. The transverse play means that no friction losses occur between the guide ridge and the guide notch when there is no transverse stress, i.e. when no guidance is necessary, and therefore the transport system operates particularly efficiently. Furthermore, in particular in the case of a plurality of guide notches, the transverse play facilitates correct orientation of the guide notches relative to the associated guide ridges and prevents jamming of the guide ridges in the guide notches.

The transverse play is advantageously configured such that the guide ridge comes into contact with the guide notch as soon as a transverse stress arises that is of such a magnitude that guidance of the conveyor belt is necessary in order to ensure reliable operation of the transport system.

The transverse play can be adjusted for example by means of the relative position in the transverse direction, the relative width, the cross-sectional shape and/or the spacing of the guide notch and guide ridge perpendicularly to the conveyor belt plane.

In an assembly state of the conveyor belt, at least one ridge is spaced apart from the left flank surface, the base surface and/or the right flank surface, in particular from both flank surfaces and the base surface, of the associated notch. According to embodiments of the invention, the assembly state is understood to be a state in which the conveyor belt is assembled in the transport system but is not mechanically stressed by conveyed goods or a drive of the conveyor belt.

The spacing ensures that the notch can interact with the ridge in a low-friction manner and without jamming, even in the absence of exact positioning of the notch relative to the ridge, in particular in the case of a plurality of notches and/or in the event of deformation of the conveyor belt under a load. Furthermore, the ridge is prevented from cutting into the conveyor belt.

For practical applications, for example a spacing between the ridge and at least one of the flank surfaces, in particular both flank surfaces, of (in each case) from 5% to 50%, in particular 10% to 30%, of the opening width of the notch, has been found to be particularly advantageous. Furthermore, a spacing between the ridge and the base surface of from 5% to 50%, in particular 10% to 30%, of the notch depth of the notch, has been found to be particularly advantageous.

At least one ridge tapers towards the conveyor belt at an opening angle, wherein the opening angle is smaller than a flank angle of the associated notch and/or is from 25° to 50°, particularly from 35° to 40°. When the opening angle is smaller than the flank angle, for example 80% to 99%, in particular 90% to 95% of the flank angle, the ridge can be inserted into the notch in a particularly simple manner and does not jam there, in particular in the event of deformation of the conveyor belt.

The ridge can taper for example in a V-shaped manner, in particular having a blunted tip. A V-shaped tip can be inserted particularly easily into the notch. A blunted tip advantageously reduces the risk of the ridge cutting into the conveyor belt.

The specified dimensions of the notches of the conveyor belt relate to a state of the conveyor belt in which it is installed in a transport system. In the installed state, the conveyor belt is generally subjected to tensile stress along the conveying direction, such that it is stretched in the longitudinal direction by for example 0.1% to 2%, compared with an unstressed state.

The plurality of the guide notches and the guide ridges that engage therein can be configured such that a respectively differently large transverse play exists between the guide notches and the associated guide ridges, when the conveyor belt is not subjected to transverse stress.

As a result, as the transverse stress increases, an increasing number of guide ridges gradually come into contact with the associated guide notches, such that the total contact surface of the guide ridges in contact with the guide notches, and the associated strength of the guidance, gradually increases. As a result, sufficiently strong guidance together with the smallest possible friction losses is always achieved, even in the event of varying transverse stress. An automatic dynamic adjustment of the guiding strength can be achieved in such a simple manner only by means of a plurality of guide notches.

The opening width of at least one notch is greater than a width of the ridge, engaging in the notch, that is in parallel with the opening width. As a result, the ridge can engage in the notch in a simple and reliable manner and without jamming, in particular even if the ridge is not positioned exactly on the notch, for example owing to manufacturing tolerances or deformations of the conveyor belt, or if the opening width is reduced due to buckling of the conveyor belt. The opening width may for example be 110% to 200%, in particular 130% to 180%, of the width of the ridge.

The base width of at least one notch is 100% to 150%, 110% to 130%, of a width of the ridge, engaging in the notch, that is in parallel with the base width. As in the case of the opening width, a sufficiently large base width also ensures simple and reliable engagement of the ridge in the notch, without jamming. In addition, the base width should also not be too large, in order that reliable interaction between the notch and the ridge is ensured. Therefore, for practical applications the mentioned value ranges have been found to be particularly advantageous, wherein the base width may be for example 2 mm to 8 mm, in particular 3 mm to 4 mm.

A method according to embodiments of the invention is configured for manufacturing a transport system according to embodiments of the invention and comprises the following steps, in the stated sequence:
a) providing a roller blank with an outer surface, rotationally symmetrical about an axis of rotation, and with two edge regions and a central region arranged along the axis of rotation, between the edge regions, and
b) longitudinal removal of material from the outer surface to generate longitudinal grooves, extending along the axis of rotation, in the outer surface with drive ridges lying therebetween, in the edge regions and in the central region, and
c) transverse removal of material from the outer surface to generate transverse grooves, extending in the circumferential direction of the roller blank about the axis of rotation, in the outer surface, and with guide ridges lying therebetween, in the central region.

The roller blank may for example be cylindrical, wherein a central longitudinal axis of the roller blank coincides with the axis of rotation. The longitudinal removal may comprise milling for example. The transverse removal may comprise turning for example.

The method according to embodiments of the invention makes it possible to manufacture a drive roller according to embodiments of the invention in a particularly simple manner, in particular when the steps are performed in the stated sequence. This is because, as a result, the longitudinal removal can for example be performed from both ends of the roller blank, as far as a boundary between the edge regions and the central region that is set only approximately. The boundary is set precisely only in the following step, by means of the transverse removal, wherein the outermost transverse grooves define the boundary between the edge regions and the central region.

Longitudinal grooves that may possibly be removed as far as into the central region are superimposed by the transverse grooves, and thus do not pose a problem for reliable guidance. Superimposition of longitudinal grooves and transverse grooves results in interrupted ridges between the respective grooves, which ridges allow for a similarly good quality of guidance and similarly reliable drive as in the case of continuous grooves.

In particular, the longitudinal removal can take place both in the edge regions and in the central region, wherein the longitudinal removal takes place over an entire length of the roller blank, along the axis of rotation. As a result, the longitudinal grooves can be created in both edge regions in a single step, meaning that the method is performed particularly simply and quickly.

The transverse removal creates transverse grooves that extend completely around the axis of rotation. This allows for reliable guidance, irrespective of a position of the drive roller with respect to a rotation about the axis of rotation.

The method comprises providing a blank for the conveyor belt of the transport system having at least one guide surface, oriented along a conveyor belt plane of the conveyor belt, for guiding the conveyor belt, on the guiding side of the conveyor belt. The blank may in particular be a conventional conveyor belt.

The method comprises, in particular after the step of providing the blank, a step of forming a number of notches, comprising the guide notches and/or the drive notches of the conveyor belt, into the at least one guide surface.

The method comprises, in particular during and/or after the step of forming the notches, a step of smoothing a base surface, a left flank surface and/or a right flank surface, in particular the base surface and the two flank surfaces, of the notches. The smoothing advantageously creates a surface of a reduced roughness compared with the guide surface, resulting in the corresponding advantages described above.

The step of forming the notches comprises machining of the guide surface, in particular milling and/or grinding the notches into the at least one guide surface. Machining makes it possible for the notches to be created in a particularly quick, simple and cost-effective manner. However, machining is disadvantageous in that material removed from the conveyor belt, in the form of particles and/or chips, may be deposited on the conveyor belt, in particular in the notches. This can increase the roughness of the surfaces in the notches, which may impair the guidance of a guide element in the notches and promote colonization of foreign bodies and microorganisms in the notches.

Milling is particularly advantageous in that the notches can thereby be produced more precisely, at a comparable amount of effort, and in that generally less removed material is deposited in the notches than in the case of grinding. Furthermore, the base surface and the flank surfaces of a notch created by milling are typically of a lower roughness than in the case of a notch created by grinding.

The step of forming the notches may for example comprise laser ablation of the guide surface. Laser ablation is advantageous in that the notches can be produced very precisely and such that the base surface and flank surfaces are particularly smooth. Disadvantages, however, are the high investment costs for a laser machining station and the lower speed of material removal compared with milling or grinding.

The method comprises mechanical clearing, from the conveyor belt, of material removed by the step of forming the notches, for example by means of brushing off, suctioning off and/or blowing off the material. The clearing takes place during and/or after the step of forming the notches, and prior to smoothing. If the clearing takes place prior to smoothing, less material has to be smoothed during the smoothing step, meaning that the smoothing can take place more quickly and more efficiently.

The smoothing comprises heating at least the base surface, the left flank surface and/or the right flank surface of the notches at a heating intensity, i.e. a specified thermal output introduced per unit area. All the mentioned surfaces of the notches, in particular also the guide surface of the conveyor belt, are heated.

The heating intensity results in heating of material that was removed when forming the notches and has for example been deposited in the notches, to above a glass transition temperature, melting temperature and/or decomposition temperature of the material. When the glass transition temperature is exceeded, a solid glass or polymer transitions into a rubbery to viscous state. The heating can thus soften, fuse and/or clear material that was removed when forming the notches and has been deposited in the notches, such that the base surface, the left flank surface and/or the right flank surface is smoothed.

The heating intensity results in heating of the guide surface to a temperature below a glass transition temperature, melting temperature and/or decomposition temperature of the material. This prevents the guide surface, in particular an edge of the guide surface that adjoins the at least one notch, from undergoing thermal deformation, as a result of which a surface structure of the guide element could be destroyed and/or the edge could become blunted, which could facilitate the guide element breaking out of the notches.

Owing to the high ratio of surface to volume of the removed material relative to the guide surface, the removed material heats up more easily than the guide surface. It is therefore possible to select a suitable heating intensity that leads to smoothing of the base surface, the left flank surface and/or the right flank surface, without thermal deformation of the guide surface occurring.

For smoothing a conveyor belt consisting of a polyurethane, for example a heating intensity of a hot air gun having an air temperature of from 120° C. to 180° C., in particular 140° C. to 160° C., has been found to be particularly advantageous.

The heating may for example comprise global heating of the base surface, the left flank surface and the right flank surface of the notches and the guide surface, for example using a hot air gun, an infrared lamp and/or a plasma source. Global heating is advantageous in that thermally induced tensioning or deformations of the conveyor belt owing to inhomogeneous heating of the conveyor belt do not occur. Global heating has been found to be advantageous in particular for a conveyor belt consisting of thermoplastics, for example a polyurethane, in order to prevent uncontrolled deformations of the conveyor belt.

Global heating is furthermore advantageous in that it is technically simple to implement; wherein, however, the heating intensity must be precisely controlled in order to prevent thermal deformation of the guide surface.

A hot air gun is particularly advantageous in that the hot air stream also allows for clearing of removed material, as well as heating.

The heating may for example comprise selective heating of surfaces of the notches relative to the guide surface, for example using a laser and/or a plasma source. Selective heating is advantageous in that thermal deformation of the guide surface is prevented. However, selective heating requires technically more complex heating devices than global heating.

Following heating, controlled cooling takes place, wherein in particular a cooling speed is selected so as to be sufficiently low that no tension arises in the conveyor belt as a result of too rapid cooling. The cooling can take place for example by means of the conveyor belt being guided through a cooling tunnel.

In particular if the conveyor belt is heated after the notches have been made, this may result in elongation of the conveyor belt in the conveying direction and associated buckling of the conveyor belt transversely to the conveying direction, as a result of which a width of the notches may be reduced. A width at which the notches are made, which width is formed when forming the notches, is therefore greater than a corresponding target width of the notches that is intended for the operation of the conveyor belt.

BRIEF DESCRIPTION

Some of the embodiments will be described in detail, with reference to the following figures, wherein like designations denote like members, wherein:

FIG. 4A shows a drive roller according to embodiments of the invention;

FIG. 4B shows a side views of the drive roller;

FIG. 4C shows a side views of the drive roller;

FIG. 4D shows an enlarged view of the detail of FIG. 4C;

FIG. 4E shows an enlarged view of the detail of FIG. 4B;

FIG. 5A is a schematic view of an edge region of a guide surface of a conveyor belt according to embodiments of the invention;

FIG. 5B is a cross section along the conveying direction TR of the conveyor belt;

FIG. 5C is an enlarged view of the region of FIG. 5B denoted Z;

DETAILED DESCRIPTION

Figure 1:
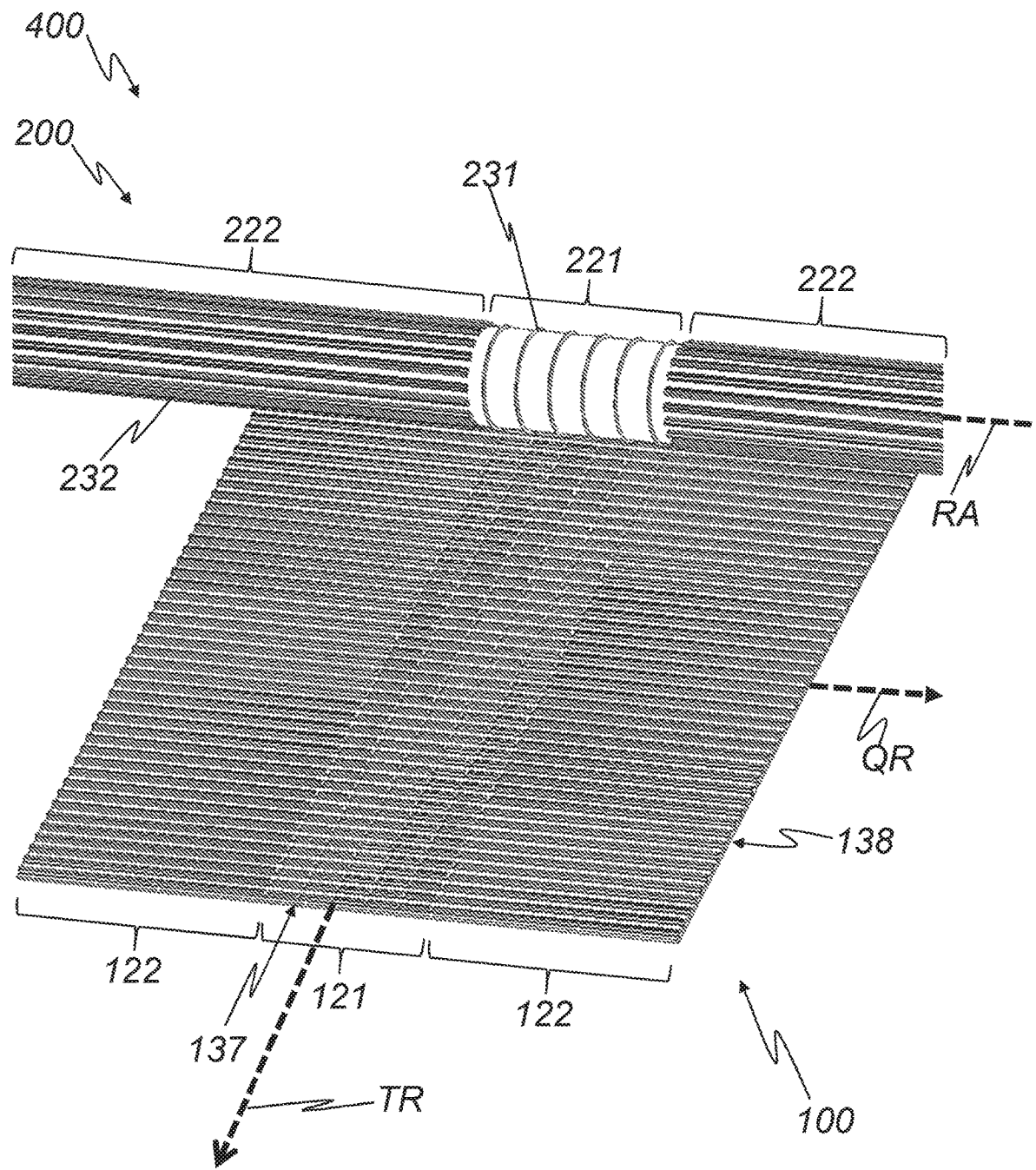
FIG. 1 is a schematic view of a transport system according to embodiments of the invention.

FIG. 1 is a schematic view of a transport system 400 according to embodiments of the invention for conveying goods in a conveying direction TR along a conveyor belt plane of a conveyor belt 100 according to embodiments of the invention. The conveyor belt 100 is driven in the conveying direction TR by means of a drive roller 200 according to embodiments of the invention and is guided along the conveying direction TR.

The conveyor belt 100 shown comprises a guide surface on a guiding side of the conveyor belt 100, which guiding side may for example form a planar side of the conveyor belt 100. In particular, the guide surface may occupy the entire guiding side.

The guide surface comprises two edge regions 122 and a central region 121 that is arranged along the conveying plane, along the transverse direction QR, and between the edge regions 122, transversely to the conveying direction TR. In the central region 121, for example, the guide surface 120 comprises a plurality of, for example six, guide notches 137 (labelled only by way of example) for guiding the conveyor belt 100 along the conveying direction TR. The longitudinal axes of the guide notches 137 are in each case oriented along the conveying direction TR.

In the edge regions 122, and in particular also in the central region 121, the guide surface comprises a plurality of drive notches 138 (labelled only by way of example) for driving the conveyor belt 100. The longitudinal axes of the drive notches 138 are in each case oriented along the transverse direction QR.

The drive roller 200 is for example substantially cylindrical and comprises an outer surface which extends around an axis of rotation RA and with which the conveyor belt 100 is in contact, wherein the conveyor belt 100 is driven by means of a rotation of the drive roller 200 about the axis of rotation RA.

The outer surface comprises two edge regions 222 and a central region 221 that is arranged along the axis of rotation RA, between the edge regions 222. In the central region 221, for example, the outer surface 220 comprises a plurality of, for example six, guide ridges 231 (labelled only by way of example) for engagement in the guide notches 137, for the purpose of guiding the conveyor belt 100 along the conveying direction TR. The guide ridges 231 are in each case arranged around the axis of rotation RA, along the circumferential direction of the drive roller 200.

In the edge regions 222, the outer surface 220 comprises a plurality of drive ridges 232 (labelled only by way of example) for engagement in the drive notches 138, for the purpose of driving the conveyor belt 100. The longitudinal axes of the drive ridges 232 are in each case oriented along the axis of rotation RA.

Figure 2:
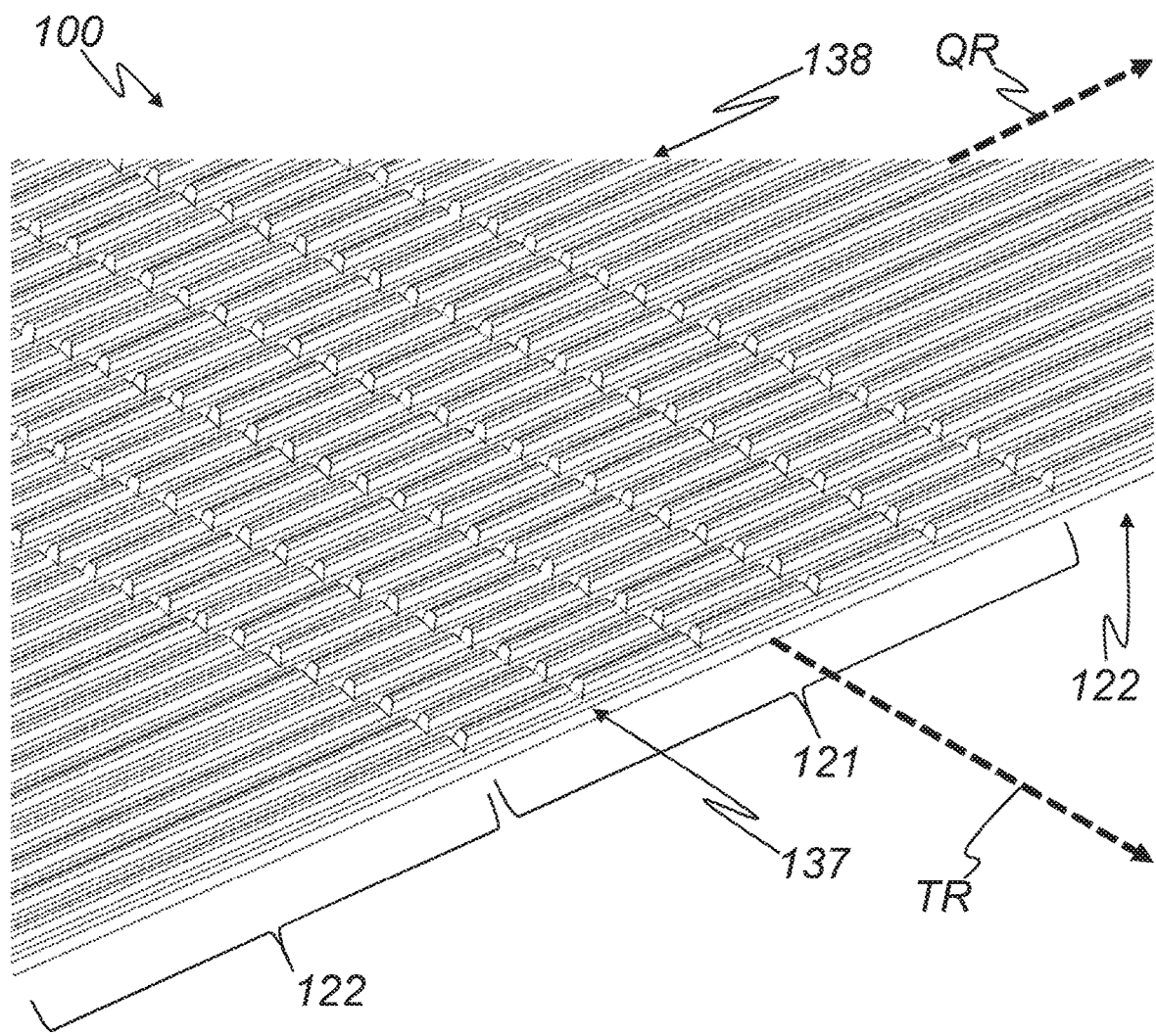
FIG. 2 is an enlarged view of the conveyor belt according to embodiments of the invention from FIG. 1.

FIG. 2 is an enlarged view of the conveyor belt 100 according to embodiments of the invention from FIG. 1. In this view, the guide notches 137 in the central region 121 of the guide surface 120, and the drive notches 138 in the central region 121 and in the edge regions 122 of the guide surface 120, can be seen more clearly.

Figure 3:
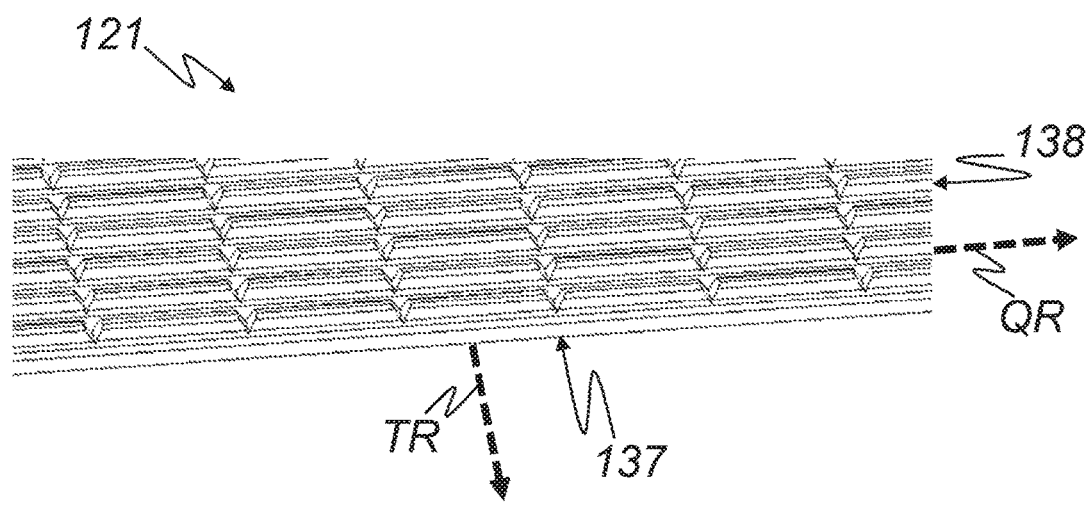
FIG. 3 is a further enlarged view of the central region of the guide surface of the conveyor belt from FIG. 1.

FIG. 3 is a further enlarged view of the central region 121 of the guide surface of the conveyor belt from FIG. 1. This view clearly shows that the drive notches 138 and guide notches 137 intersect in the central region 121.

FIG. 4 shows a drive roller 200 according to embodiments of the invention, wherein the dimensions of the drive roller 200 are specified merely as examples. FIGS. 4A and 4B are each side views of the drive roller 200, with and without dimensions. FIG. 4C is an end view of the drive roller 200. FIG. 4D is an enlarged view of the detail of FIG. 4C marked X. FIG. 4E is an enlarged view of the detail of FIG. 4B marked Y.

The drive roller 200 shown is for example configured in the same way as that described for the drive roller 200 shown in FIG. 1.

It can be seen, in FIG. 4D, that the drive ridges 232 may for example have a trapezoidal cross section, in particular having rounded edges, that tapers outwards from the axis of rotation RA. A cross section of this kind allows for reliable driving, without the risk of the drive ridges 232 jamming in drive notches of a conveyor belt.

Including the drive ridges 232, the diameter D of the drive roller 200 is 30.6 mm for example. In the central region 221, the diameter of the drive roller 200 is for example 29.8 mm including the guide ridges 231, and 28.9 mm between the guide ridges 231.

FIG. 4E shows a cross section, by way of example, of a guide ridge 231. The cross section is for example V-shaped, for example having an opening angle $\beta$ of 38°. As a result, the guide ridge 231 can be formed into a guide notch of a conveyor belt in a simple manner and without jamming, and at the same time provides reliable guidance. The outer end of the guide ridge 231, with respect to the axis of rotation RA, may be flattened, for example having a width of 0.14 mm. As a result, the material stress of a conveyor belt guided by the guide ridge is reduced compared with an embodiment having a non-flattened end.

FIG. 5 is a schematic view of an edge region 122 of a guide surface of a conveyor belt 100 according to embodiments of the invention. In this case, FIG. 5A is a plan view of the edge region 122 and FIG. 5B is a cross section along the conveying direction TR of the conveyor belt 100. FIG. 5C is an enlarged view of the region of FIG. 5B denoted Z. Dimensions specified in the figure are to be understood to be merely by way of example.

The edge region 122 comprises a number of drive notches 138, the longitudinal axes of which are oriented along a transverse direction QR, transversely to the conveying direction TR. A cross section of the drive notches 138 along the conveying direction TR is for example trapezoidal, wherein the drive notches 138 widen from the conveyor belt 100 towards the outside. A cross section of this kind allows for reliable driving, without the risk of the drive ridges of a drive roller jamming in the drive notches 138. In this case, for example ridges also having a trapezoidal cross section, and a flank angle $\alpha$ of 40°, result between the drive notches 138. In particular, the edges of the drive notches 138 may be rounded, for example having a radius of curvature of 0.4 mm.

A spacing between the drive notches 138 along the conveying direction TR is for example 4.8 mm, in an unstressed state of the conveyor belt 100. As a result, the conveyor belt 100 can advantageously be used together with drive rollers for T5 timing belts that are known from the prior art and that comprise drive ridges having a spacing of 5 mm. If the conveyor belt 100 is used in a transport system, the belt is under tensile stress along the conveying direction, with the result that the spacing between the drive notches 138 increases, in particular to 5 mm.

A base width of the drive notches 138 is for example 2.8 mm, and an opening width is for example 2.55 mm. A conveyor belt thickness TD of the conveyor belt 100 is for example 2.2 mm, and a notch depth is for example 1.2 mm.

Figure 6A:
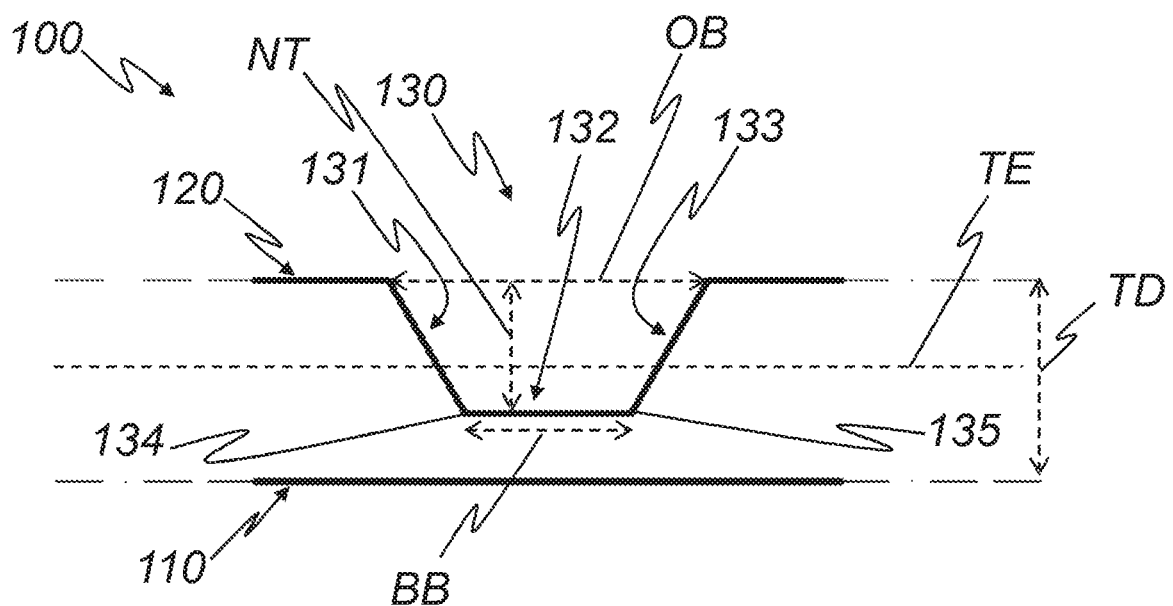
FIG. 6A is a schematic view of an embodiment according to embodiments of the invention of a conveyor belt.
Figure 6B:
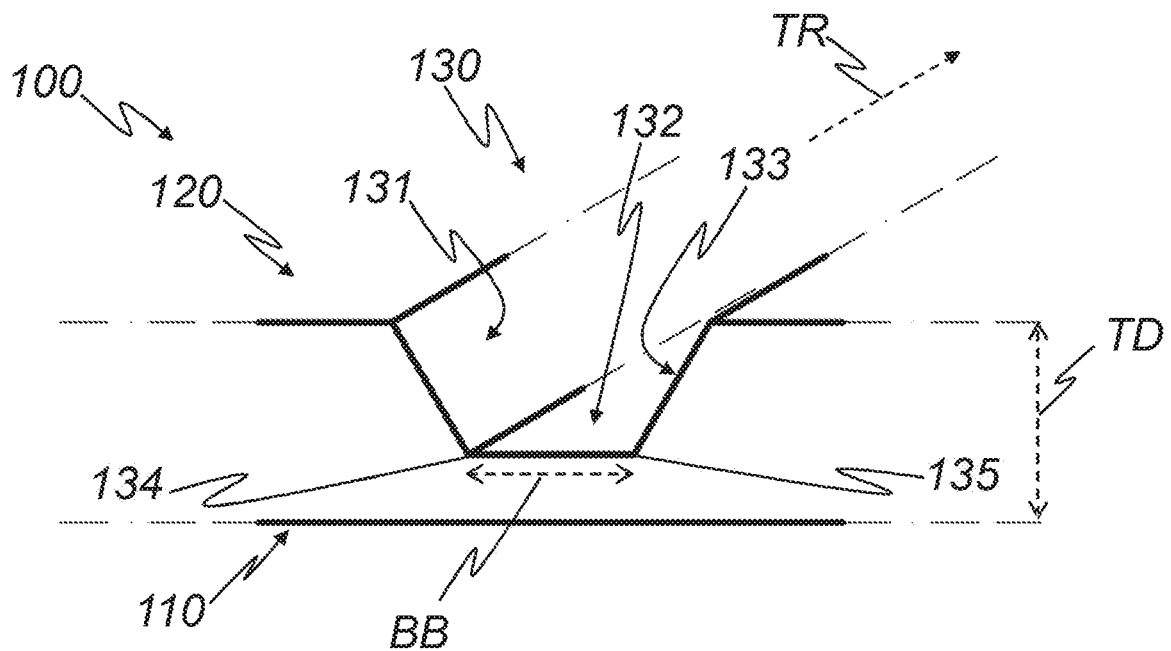
FIG. 6B is a perspective sectional view of FIG. 6A.

FIG. 6 is a schematic view of an embodiment according to embodiments of the invention of a conveyor belt 100, shown in a cross section (FIG. 6A) and in a perspective section (FIG. 6B). The conveyor belt 100 is configured for a transport system (not shown) for conveying goods (not shown) in a conveying direction TR along a conveyor belt plane TE of the conveyor belt 100. In the cross-sectional view, the conveying plane TE and the conveying direction TR are perpendicular to the drawing plane.

On a bearing side of the conveyor belt 100 the conveyor belt 100 comprises a bearing surface 110 for carrying the goods, which surface is oriented along the conveyor belt plane TE, and on a guiding side of the conveyor belt 100 the conveyor belt comprises a guide surface 120 for guiding the conveyor belt 100, which surface is oriented along the conveyor belt plane TE. The bearing side is for example opposite the guiding side, with respect to the conveyor belt plane TE.

A notch 130, in particular a guide notch or drive notch, is made in the guide surface 120.

The notch 130 comprises a base surface 132 for limiting a penetration depth of a drive ridge or a guide ridge into the conveyor belt 100, and a left flank surface 131 that is arranged so as to be oblique to the conveyor belt plane and connects the guide surface 120 to the base surface 132, and at least one right flank surface 133 that is arranged so as to be oblique to the conveyor belt plane TE and connects the guide surface 120 to the base surface 132.

A base width BB of the base surface 132 perpendicularly to the conveying direction TR is smaller than an opening width OB of the notch 130 perpendicularly to the conveying direction TR and in a plane with the guide surface 120.

A notch depth NT of the notch 130 perpendicularly to the conveyor belt TE is for example at least 50% of a conveyor belt thickness TD perpendicularly to the conveyor belt plane TE.

The base surface 132 is for example flat and oriented along the conveyor belt plane TE, wherein the left flank surface 131 transitions into the base surface 132 at a left transition region 134, and the right flank surface 133 transitions into the base surface at a right transition region 135, which transition regions are in the form of an edge in each case.

The left flank surface 131 and the right flank surface 133 are flat.

In the embodiment shown, the notch 130 for example has a trapezoidal cross section perpendicularly to the conveying direction TR.

Figure 7A:
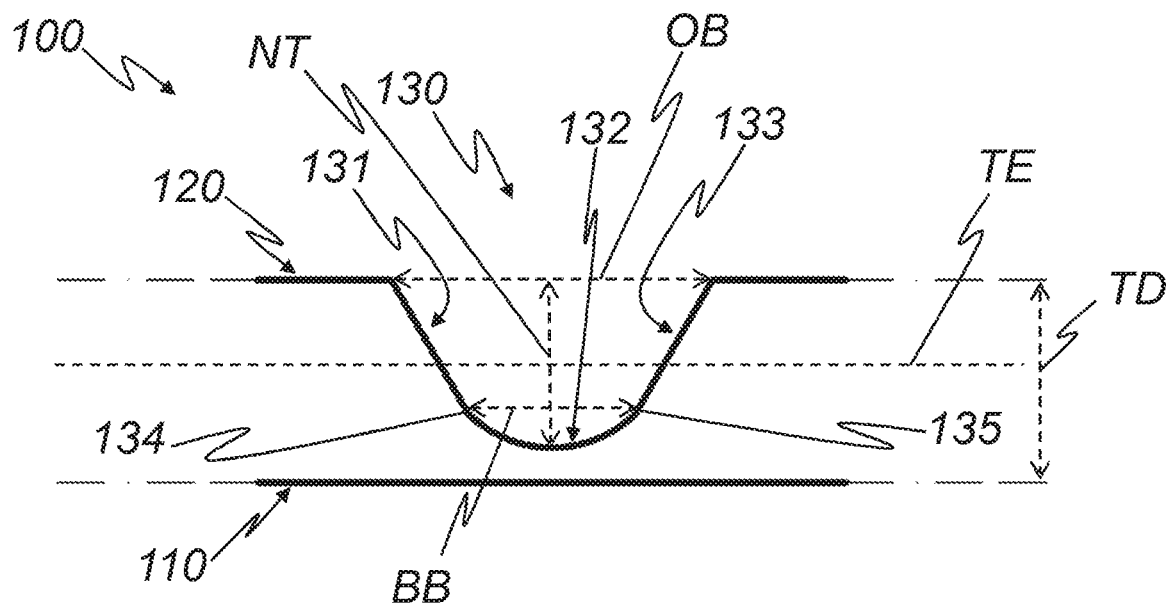
FIG. 7A is a schematic view of a further embodiment according to embodiments of the invention of a conveyor belt.
Figure 7B:
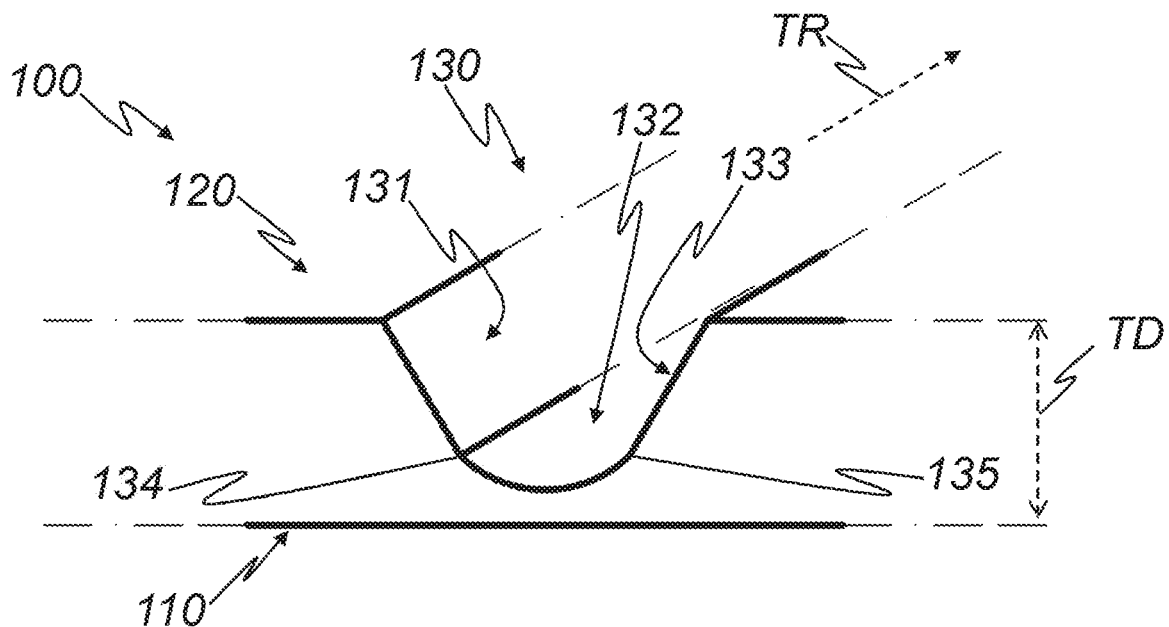
FIG. 7B is a perspective sectional view of FIG. 7A.

FIG. 7 is a schematic view of a further embodiment according to embodiments of the invention of a conveyor belt 100, shown in a cross section (FIG. 7A) and in a perspective section (FIG. 7B). In the cross-sectional view, the conveying plane TE and the conveying direction TR are perpendicular to the drawing plane.

The conveyor belt 100 shown in FIG. 7 differs from the conveyor belt 100 shown in FIG. 6 in that the base surface 132 is not flat, but is instead concavely curved towards the notch 130, about the longitudinal axis of the notch 130. As a result, the transition regions 134, 135 can be formed as edges, as shown, or can be rounded.

Figure 8A:
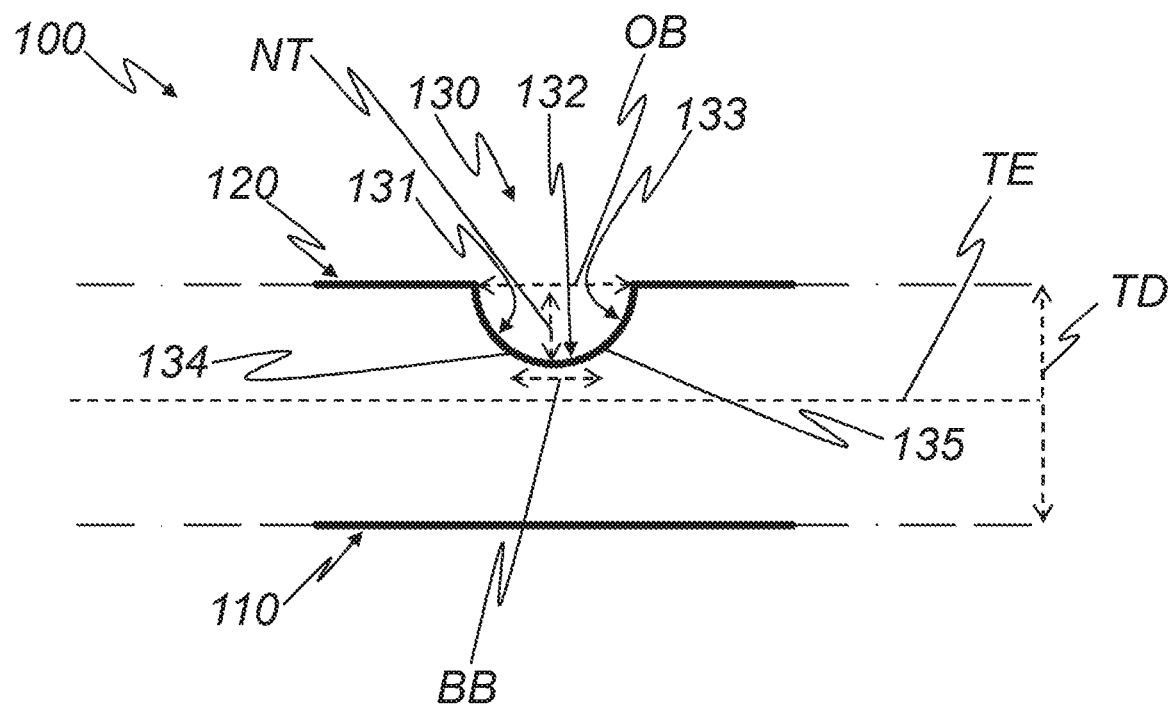
FIG. 8A is a schematic view of a further embodiment according to embodiments of the invention of a conveyor belt.
Figure 8B:
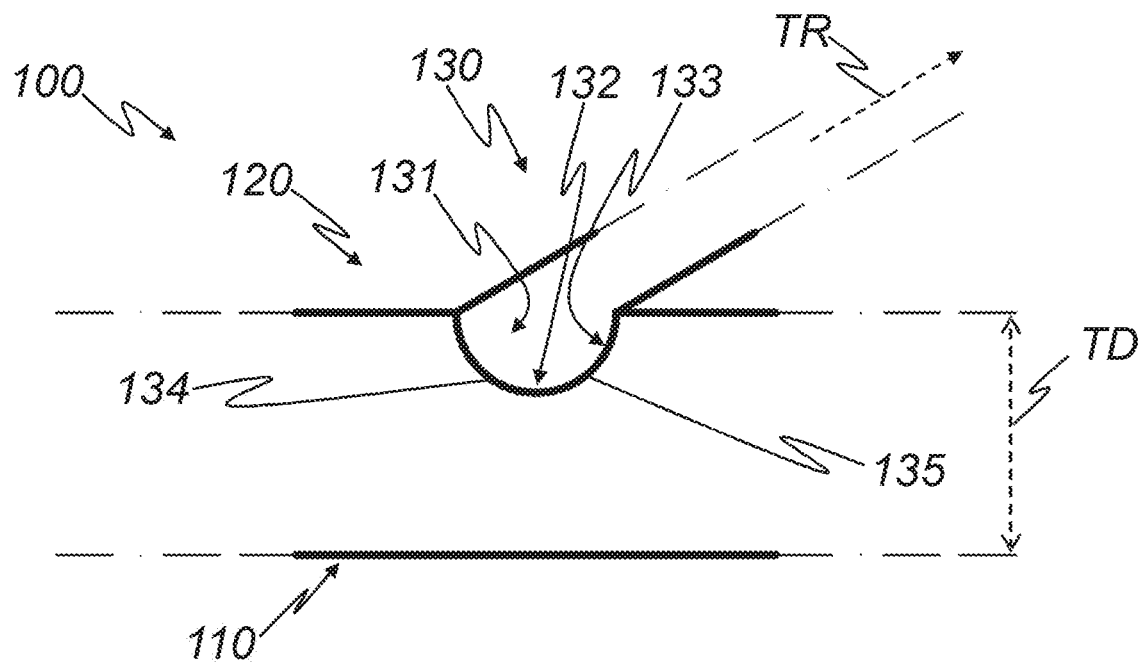
FIG. 8B is a perspective sectional view of FIG. 8A.

FIG. 8 is a schematic view of an embodiment of a conveyor belt 100 comprising an alternative embodiment of the transition regions 134, 135, shown in a cross section (FIG. 8A) and in a perspective section (FIG. 8B). In the cross-sectional view, the conveying plane TE and the conveying direction TR are perpendicular to the drawing plane.

The conveyor belt 100 shown in FIG. 8 differs from the conveyor belt 100 shown in FIG. 7 in that the left outer surface 131 and the right outer surface 133 are not flat, but are instead concavely curved towards the notch 130, about the longitudinal axis of the notch 130.

Furthermore, the left transition region 134 and the right transition region 135 are in each case not formed as an edge but are instead rounded.

In the embodiment shown, the notch 130 for example has a semi-circular cross section perpendicularly to the conveying direction TR.

Figure 9A:
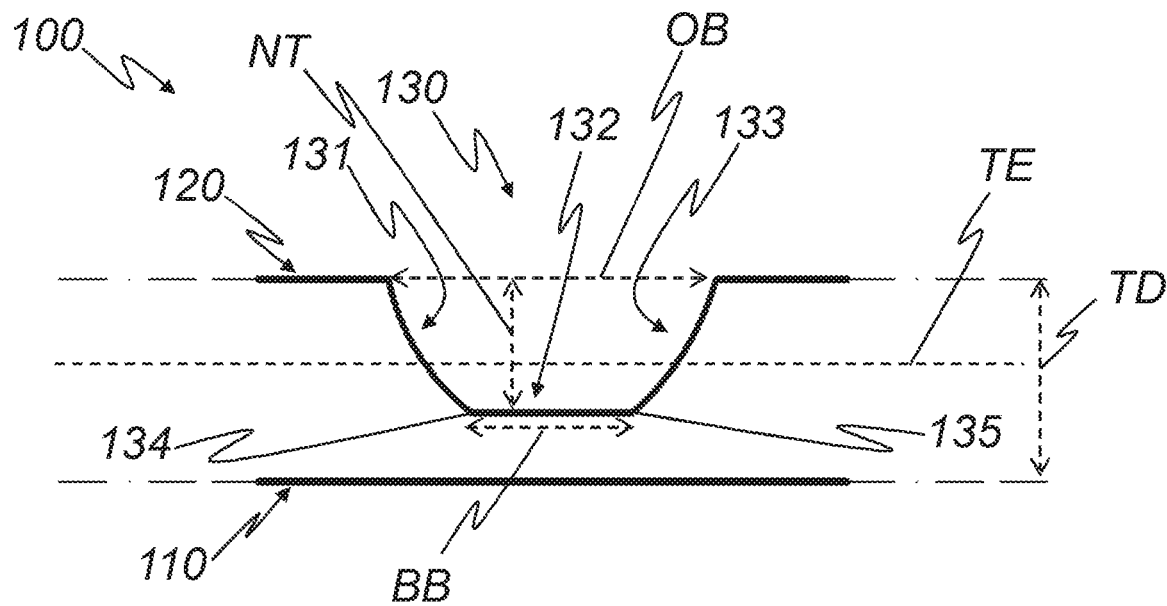
FIG. 9A is a schematic view of a further embodiment according to embodiments of the invention of a conveyor belt.
Figure 9B:
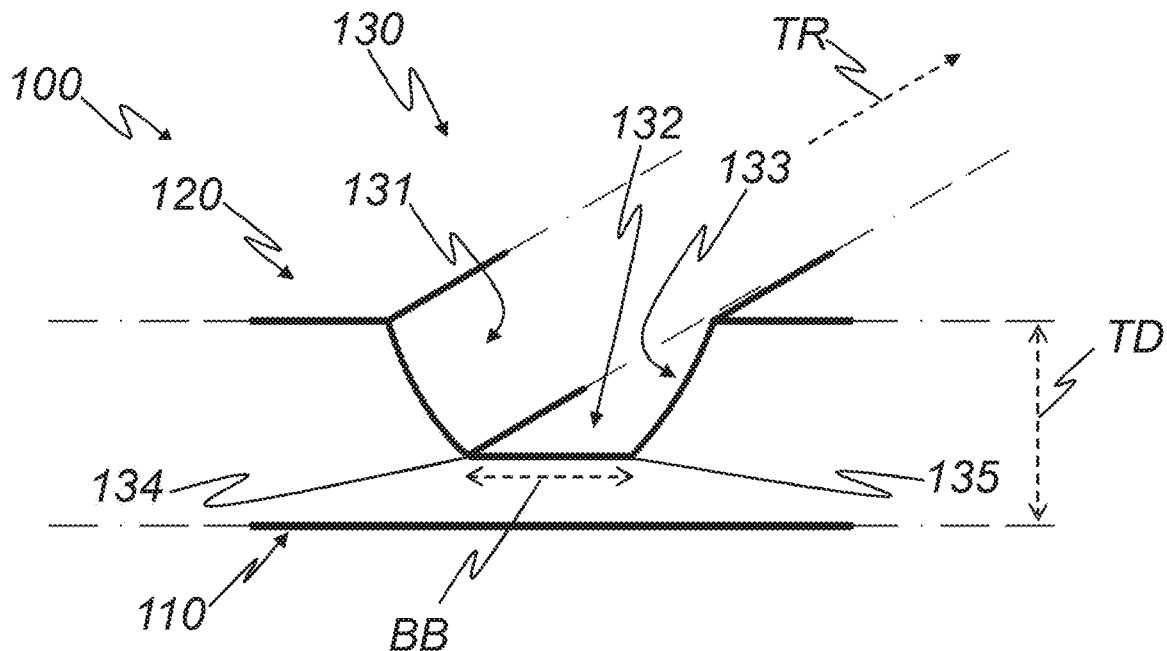
FIG. 9B is a perspective sectional view of FIG. 9A.

FIG. 9 is a schematic view of a further embodiment according to embodiments of the invention of a conveyor belt 100, shown in a cross section (FIG. 9A) and in a perspective section (FIG. 9B).

The conveyor belt 100 shown in FIG. 9 differs from the conveyor belt 100 shown in FIG. 6 in that the left flank surface 131 and the right flank surface 133 are not flat, but are instead concavely curved towards the notch 130, about the longitudinal axis. As a result, the transition regions 134, 135 can be formed as edges, as shown, or can be rounded.

Figure 10:
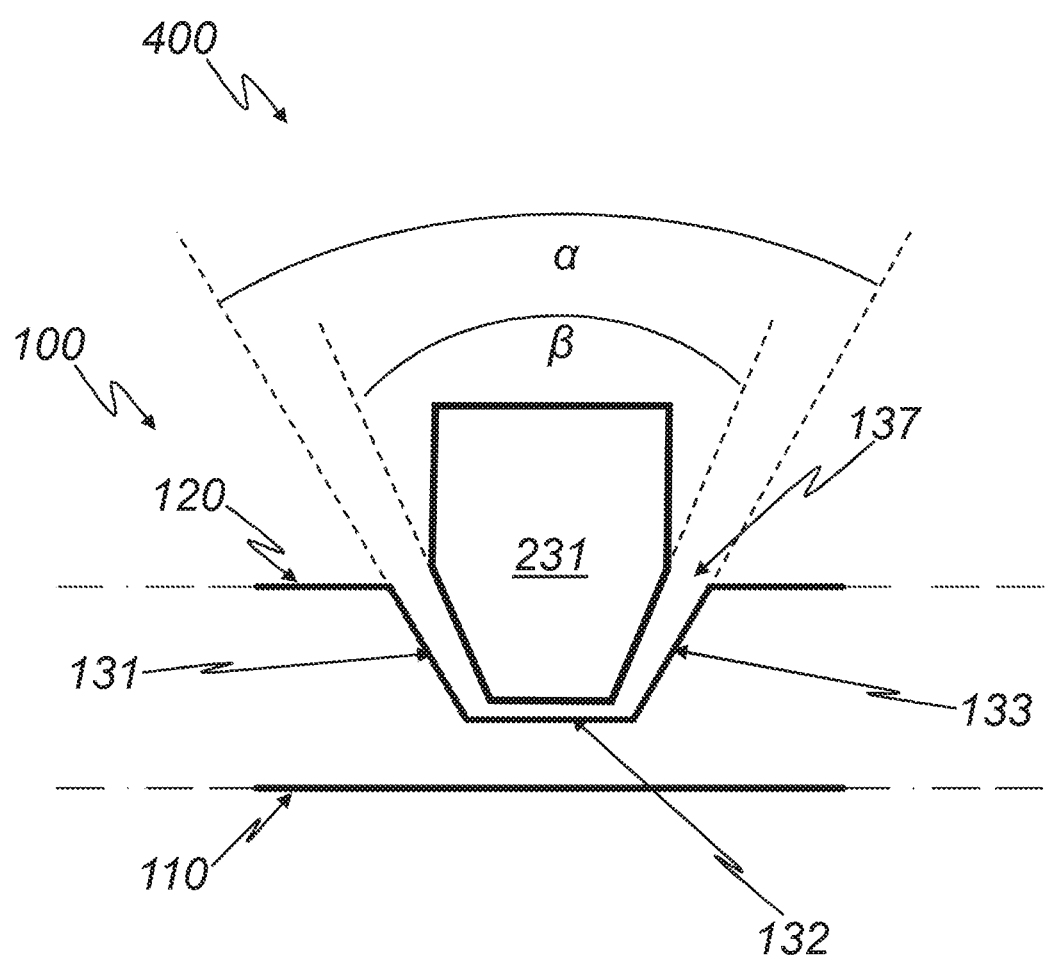
FIG. 10 is a schematic view of an embodiment according to embodiments of the invention of a transport system.

FIG. 10 is a schematic cross-sectional view of an embodiment according to embodiments of the invention of a transport system 400 comprising a conveyor belt 100 according to the invention and a guide ridge 231. The guide ridge 231, for example a lateral ridge that extends around the at least one drive roller (not shown) of the transport system 400 in the circumferential direction, engages in an associated guide notch 137 of the conveyor belt 100 for the purpose of guiding the conveyor belt 100 along the conveying direction TR.

A drive ridge of the drive roller and/or an associated drive notch of the conveyor belt can be configured in a manner analogous to the guide ridge 231 shown here and the guide notch 137 shown here.

The conveyor belt 100 shown in FIG. 10 for example corresponds to the conveyor belt 100 shown in FIG. 6, wherein, for the sake of clarity, not all the features are provided with reference signs again.

The left flank surface 131 and the right flank surface 133 of the guide notch 137 enclose a flank angle $\alpha$ of for example 40°.

The guide ridge 231 is for example configured so as to taper towards the conveyor belt 100 at an opening angle $\beta$ and is in particular configured so as to taper in a V-shaped manner, having a blunted tip. The opening angle $\beta$ is smaller than the flank angle $\alpha$ and is for example 38°.

In an assembly state of the conveyor belt, the guide ridge 231 is spaced apart from the left flank surface 131, the base surface 132 and the right flank surface 133 of the guide notch 137.

Figure 11:
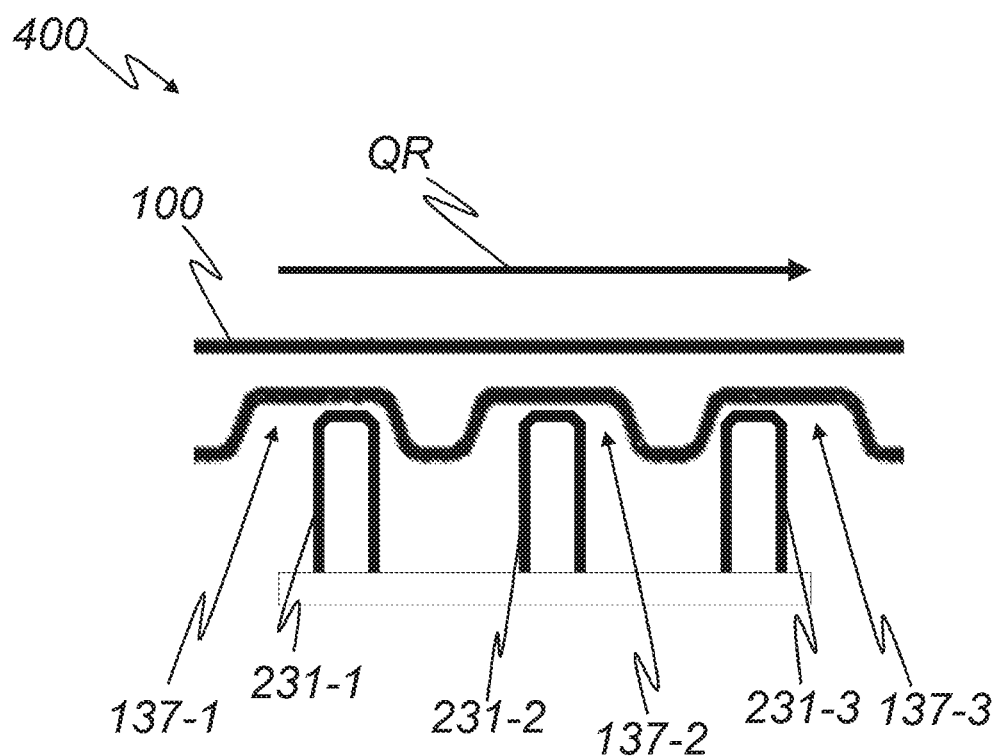
FIG. 11 is a schematic view of a further transport system according to embodiments of the invention.

FIG. 11 is a schematic view of a further transport system 400 according to embodiments of the invention. In the example shown, the plurality of the guide notches 137 and the guide ridges 231 that engage therein are configured such that a respectively differently large transverse play exists between the guide notches 137 and the associated guide ridges 231, along the transverse direction QR of the conveyor belt, when the conveyor belt 100 is not subjected to transverse stress. For example, a first guide ridge 231-1 in the transverse direction QR is aligned with a right edge of a first guide notch 137-1, a second guide ridge 231-2 is aligned centrally with a second guide notch 231-2, and a third guide ridge 231-3 is aligned with a left edge of a third guide notch 137-3. This results in a contact surface between the guide ridges 231 and guide notches 137 that is of a varying size, and thus in a guiding strength of varying magnitude, depending on the magnitude of a transverse stress of the conveyor belt 100. This correlation is shown in FIG. 12.

Figure 12:
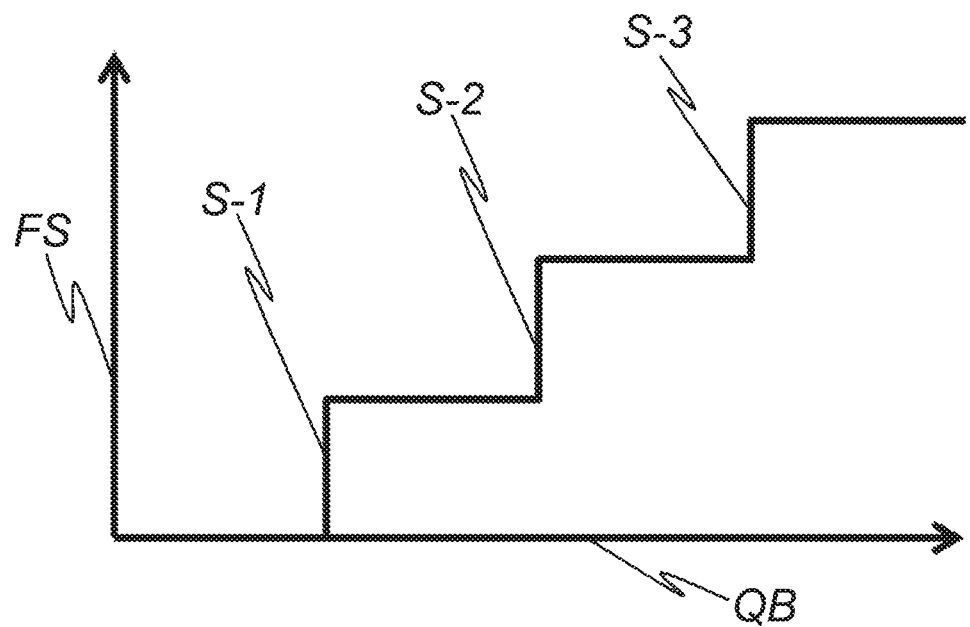
FIG. 12 is schematically shows a curve of a guiding strength, as a function of a transverse stress of the conveyor belt from FIG. 11.

FIG. 12 schematically shows a curve of a guiding strength FS, as a function of a transverse stress QB of the conveyor belt 100 shown in FIG. 11. If there is no transverse stress QB there is no guiding strength FS, because the guide ridges 231 are not in contact with the guide notches 137, owing to the mechanical play thereof in the transverse direction QR. As the transverse stress QB increases, the conveyor belt is increasingly deformed in the transverse direction. As a result, the guide ridges 231-1, 231-2 and 231-3 gradually come into contact with the guide notches 137-1, 137-2 and 137-3, respectively, with the result that the guiding strength FS increases in a stepwise manner, at each additional contact, at the steps S-1, S-2 and S-3.

LIST OF REFERENCE SIGNS 100 conveyor belt
110 bearing surface
120 guide surface
121 central region
122 edge region
130 notch
131 left flank surface
132 base surface
133 right flank surface 134 left transition region
135 right transition region
137 guide notch
200 drive roller
221 center region
222 edge region
231 guide ridge
232 drive ridge
138 drive notch
400 transport system
BB base width
D diameter
FS guiding strength
NT notch depth
OB opening width
RA axis of rotation
QB transverse stress
QR transverse direction
S step
TD conveyor belt thickness
TE conveyor belt plane
TR conveying direction
α flank angle
β opening angle

The invention claimed is:

1. A transport system for conveying goods in a conveying direction along a conveyor belt plane of a conveyor belt, comprising:
   a) on a bearing side of the conveyor belt, at least one bearing surface for carrying the goods, the at least one bearing surface is oriented along the conveyor belt plane, and
   b) on a guiding side of the conveyor belt, at least one guide surface, oriented along the conveyor belt plane, for guiding the conveyor belt,
   c) wherein the guide surface includes a plurality of notches, wherein the notches
   d) include a plurality of guide notches, wherein a longitudinal axis of each of the guide notches is oriented along the conveying direction, and
   e) include a number of drive notches, wherein a longitudinal axis of each of the drive notches is oriented in a transverse direction, transversely to the conveying direction, and
   f) wherein the transport system includes at least one drive roller for driving the conveyor belt, which is in contact with an outer surface of the drive roller, through a rotation of the drive roller about an axis of rotation,
   g) wherein the outer surface includes a plurality of ridges,
   h) wherein the ridges include a number of drive ridges that engage in the drive notches for driving the conveyor belt along the conveying direction, wherein a longitudinal axis of each of the drive ridges is oriented along the axis of rotation,
   i) wherein the ridges include a plurality of guide ridges that engage in the guide notches for guiding the conveyor belt along the conveying direction, wherein each of the guide ridges extends about the axis of rotation in the circumferential direction of the drive roller,
   j) wherein at least one of the guide notches of the conveyor belt, and the guide ridge of the drive roller engaging therein, are configured such that mechanical transverse play in the transverse direction exists between the guide notch and the guide ridge, without transverse stressing of the conveyor belt in the transverse direction, wherein the guide surface of the conveyor belt includes two edge regions and a central region arranged in transverse direction between the edge regions, wherein the guide notches are arranged in the central region and the drive notches are arranged in the edge regions and in the central region, wherein no guide notches are arranged in the edge regions.

2. The transport system according to claim 1, wherein
   a) an opening width of at least one of the notches of the conveyor belt is greater than a width of the ridge of the drive roller engaging in the notch, parallel to the opening width, and/or
   b) a base width of at least one of the notches of the conveyor belt amounts to 100% to 150%, or of a width of the ridge of the drive roller engaging in the notch parallel to the base width.

3. The transport system according to claim 1, wherein the conveyor belt has a conveyor belt thickness, perpendicular to the conveying plane, from 1 mm to 5 mm.

4. The transport system according to claim 1, wherein the conveyor belt includes at least one guide layer containing the notches, at least one bearing layer forming the bearing surface and at least one reinforcement layer for mechanical reinforcement of the conveyor belt.

5. A transport system for conveying goods in a conveying direction along a conveyor belt plane of a conveyor belt, comprising:
   a) on a bearing side of the conveyor belt, at least one bearing surface for carrying the goods, the at least one bearing surface is oriented along the conveyor belt plane, and
   b) on a guiding side of the conveyor belt, at least one guide surface, oriented along the conveyor belt plane, for guiding the conveyor belt,
   c) wherein the guide surface includes a plurality of notches, wherein the notches
   d) include a plurality of guide notches, wherein a longitudinal axis of each of the guide notches is oriented along the conveying direction, and
   e) include a number of drive notches, wherein a longitudinal axis of each of the drive notches is oriented in a transverse direction, transversely to the conveying direction, and
   f) wherein the transport system includes at least one drive roller for driving the conveyor belt, which is in contact with an outer surface of the drive roller, through a rotation of the drive roller about an axis of rotation,
   g) wherein the outer surface includes a plurality of ridges,
   h) wherein the ridges include a number of drive ridges that engage in the drive notches for driving the conveyor belt along the conveying direction, wherein a longitudinal axis of each of the drive ridges is oriented along the axis of rotation,
   i) wherein the ridges include a plurality of guide ridges that engage in the guide notches for guiding the conveyor belt along the conveying direction, wherein each of the guide ridges extends about the axis of rotation in the circumferential direction of the drive roller,
   j) wherein at least one of the guide notches of the conveyor belt, and the guide ridge of the drive roller engaging therein, are configured such that mechanical transverse play in the transverse direction exists between the guide notch and the guide ridge, without transverse stressing of the conveyor belt in the transverse direction, wherein at least one of the notches includes:
   a) at least one base surface for limiting a penetration depth of the guide ridge or drive ridge into the conveyor belt, and b) at least one left flank surface, arranged obliquely to the conveyor belt plane, and connecting the guide surface with the base surface, and c) at least one right flank surface, arranged obliquely to the conveyor belt plane, and connecting the guide surface with the base surface, wherein d) a base width of the base surface, perpendicularly to the longitudinal axis of the notch, is smaller than an opening width of the notch perpendicularly to the longitudinal axis of the notch and in a plane with the guide surface.

6. The transport system according to claim 1, wherein the outer surface of the at least one drive roller includes two edge regions and a central region arranged between the edge regions along the axis of rotation, wherein the guide ridges are arranged exclusively in the central region and the drive ridges are arranged exclusively in the edge regions.

7. The transport system according to claim 1, wherein a diameter of the drive roller measured perpendicularly to the axis of rotation amounts to 15 mm to 45 mm.

8. A method for manufacturing a transport system for conveying goods in a conveying direction along a conveyor belt plane of a conveyor belt, said transport system having:

a) on a bearing side of the conveyor belt, at least one bearing surface for carrying the goods, the at least one bearing surface is oriented along the conveyor belt plane, and b) on a guiding side of the conveyor belt, at least one guide surface, oriented along the conveyor belt plane, for guiding the conveyor belt, c) wherein the guide surface includes a plurality of notches, wherein the notches d) include a plurality of guide notches, wherein a longitudinal axis of each of the guide notches is oriented along the conveying direction, and e) include a number of drive notches, wherein a longitudinal axis of each of the drive notches is oriented in a transverse direction, transversely to the conveying direction, and f) wherein the transport system includes at least one drive roller for driving the conveyor belt, which is in contact with an outer surface of the drive roller, through a rotation of the drive roller about an axis of rotation, g) wherein the outer surface includes a plurality of ridges, h) wherein the ridges include a number of drive ridges that engage in the drive notches for driving the conveyor belt along the conveying direction, wherein a longitudinal axis of each of the drive ridges is oriented along the axis of rotation, i) wherein the ridges include a plurality of guide ridges that engage in the guide notches for guiding the conveyor belt along the conveying direction, wherein each of the guide ridges extends about the axis of rotation in the circumferential direction of the drive roller, j) wherein at least one of the guide notches of the conveyor belt, and the guide ridge of the drive roller engaging therein, are configured such that mechanical transverse play in the transverse direction exists between the guide notch and the guide ridge, without transverse stressing of the conveyor belt in the transverse direction, wherein in the method includes the following steps in the named sequence:

a) providing a roller blank with an outer surface, rotationally symmetrical about an axis of rotation, and with two edge regions and a central region arranged along the axis of rotation, between the edge regions, b) longitudinal removal of material from the outer surface to generate longitudinal grooves, extending along the axis of rotation, in the outer surface with drive ridges lying therebetween, in the edge regions and in the central region, and c) transverse removal of material from the outer surface to generate transverse grooves, extending in the circumferential direction of the roller blank about the axis of rotation, in the outer surface, and with guide ridges lying therebetween, in the central region.

9. The method according to claim 8, wherein the longitudinal removal occurs over an entire length of the roller blank, along the axis of rotation.

10. The method according to claim 8, wherein the following steps:

a) providing a blank for the conveyor belt of the transport system with at least one guide surface, oriented along a conveyor belt plane of the conveyor belt, for guiding the conveyor belt, on the guiding side of the conveyor belt, b) forming a number of notches, including the guide notches and/or the drive notches of the conveyor belt, into the at least one guide surface, and c) smoothing a base surface, a left flank surface and/or a right flank surface of the notches.

11. The method according to claim 10, wherein the forming of the notches includes a machining of the guide surface, where the machining is at least one of a milling and a grinding the notches into the at least one guide surface.

12. The method according to claim 10, wherein the smoothing includes a heating of at least the base surface, the left flank surface and/or the right flank surface of the notches with a heat intensity, wherein the heat intensity is selected to heat material of the conveyor belt, removed in the forming of the notches, to above a glass transition temperature, melting temperature and/or decomposition temperature of the material, and to heat the guide surface to a temperature below a glass transition temperature, melting temperature and/or decomposition temperature of the material.

13. The method according to claim 12, wherein the heating includes a global heating of the base surface, the left flank surface and the right flank surface of the notches and the guide surface, with a hot air gun.

* * * * *